(12) United States Patent
Frenne et al.

(10) Patent No.: US 11,128,414 B2
(45) Date of Patent: Sep. 21, 2021

(54) METHOD AND APPARATUS FOR BROADCASTING SYNCHRONIZATION SIGNALS AND SYSTEM INFORMATION IN A NEW TYPE CARRIER

(71) Applicant: Telefonaktiebolaget L M Ericsson (publ), Stockholm (SE)

(72) Inventors: Mattias Frenne, Uppsala (SE); George Jöngren, Sundbyberg (SE); Johan Furuskog, Stockholm (SE); Daniel Larsson, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 792 days.

(21) Appl. No.: 13/978,736

(22) PCT Filed: Apr. 5, 2013

(86) PCT No.: PCT/SE2013/050373
§ 371 (c)(1),
(2) Date: Jul. 9, 2013

(87) PCT Pub. No.: WO2014/163543
PCT Pub. Date: Oct. 9, 2014

(65) Prior Publication Data
US 2014/0301353 A1   Oct. 9, 2014

(51) Int. Cl.
*H04W 56/00* (2009.01)
*H04L 5/00* (2006.01)
(Continued)

(52) U.S. Cl.
CPC ............ *H04L 5/003* (2013.01); *H04L 5/0005* (2013.01); *H04L 5/0048* (2013.01);
(Continued)

(58) Field of Classification Search
CPC ........ H04J 2011/0096; H04J 11/0069; H04W 56/001; H04W 56/00; H04W 56/002;
(Continued)

(56) References Cited

U.S. PATENT DOCUMENTS

2008/0232240 A1*  9/2008  Baum .................. H04L 5/0007
                                                       370/210
2010/0085934 A1*  4/2010  Wang .................. H04L 5/0044
                                                       370/330
(Continued)

FOREIGN PATENT DOCUMENTS

CN    WO 2014110804 A1 *  7/2014  ........... H04W 4/005
WO    WO 2014/110804 A1 *  7/2014

OTHER PUBLICATIONS

"Considerations on Primary and Second Synchronization Signals for New Carrier Type," LG Electronics; 3GPP TSG RAN WG1#68bis; R1-121423; Mar. 26-30, 2012. pp. 1-3. Jeju, Korea.*
(Continued)

*Primary Examiner* — Salvador E Rivas
(74) *Attorney, Agent, or Firm* — Murphy, Bilak & Homiller, PLLC

(57) ABSTRACT

Base station and UE and methods therein for broadcast in a wireless communication network. The method in the base station comprises determining (1201a-c) a set of transmission resources, out of a number of sets of transmission resources, based on a property associated with a synchronization signal of the base station, and further transmitting (1202a-c) the synchronization signal and/or system information, such as a MIB, in the determined set of transmission resources.

9 Claims, 14 Drawing Sheets

(51) Int. Cl.
*H04L 27/26* (2006.01)
*H04W 72/04* (2009.01)

(52) U.S. Cl.
CPC ........ *H04L 5/0053* (2013.01); *H04L 27/2613* (2013.01); *H04L 27/2692* (2013.01); *H04W 56/001* (2013.01); *H04W 72/0466* (2013.01)

(58) Field of Classification Search
CPC ............. H04W 72/0466; H04L 27/261; H04L 27/2613; H04L 27/2655; H04L 27/2673; H04L 5/0005; H04N 21/242; H04N 21/4302
See application file for complete search history.

(56) References Cited

U.S. PATENT DOCUMENTS

| | | | | |
|---|---|---|---|---|
| 2010/0260081 | A1* | 10/2010 | Damnjanovic et al. | 370/281 |
| 2010/0260156 | A1* | 10/2010 | Lee | H04W 56/0035 370/336 |
| 2011/0111781 | A1* | 5/2011 | Chen | H04B 7/02 455/507 |
| 2012/0039330 | A1* | 2/2012 | Baldemair | H04W 56/0015 370/350 |
| 2012/0276895 | A1* | 11/2012 | Choi | H04W 52/0235 455/422.1 |
| 2013/0114560 | A1* | 5/2013 | Liu | H04L 1/0026 370/329 |
| 2013/0235821 | A1* | 9/2013 | Chen | H04W 72/0406 370/329 |
| 2013/0259024 | A1* | 10/2013 | Zhang | H04J 11/0073 370/350 |
| 2013/0265945 | A1* | 10/2013 | He | H04W 60/04 370/329 |
| 2014/0036747 | A1* | 2/2014 | Nory et al. | 370/311 |
| 2014/0286286 | A1* | 9/2014 | Yamazaki | H04W 56/00 370/329 |
| 2015/0304932 | A1* | 10/2015 | Wei | H04J 11/0069 370/331 |

OTHER PUBLICATIONS

Steven M. Kaplan, Wiley Electrical & Electronics Engineering Dictionary 366, 659 (2004).*
Author Unknown, "Considerations on Primary and Second Synchronization Signals for New Carrier Type," LG Electronics; 3GPP TSG RAN WG1#68bis; R1-121423; Mar. 26-30, 2012. pp. 1-3. Jeju, Korea.
Author Unknown, "PSS/SSS Configurations for Additional Carrier Types," Huawei, HiSilicon; 3GPP TSG RAN WG1 meeting #68bis; R1-120973; Mar. 26-30, 2012. pp. 1-3. Jeju, Korea.
Author Unknown, "Discussion on Time and Frequency Synchronisation for the Additional Carrier Type," NEC Group; TSG-RAN WG1#68; R1-120247; Feb. 6-10, 2012. pp. 1-4. Dresden, Germany.
Unknown, Author, "CRS Design for NCT—Discussion on Cell-specific Frequency Shift", 3GPP TSG RAN WG1 Meeting #69, R1-122656, Intel Corporation, Prague, Czech Republic, May 21-25, 2012, pp. 1-2.
Unknown, Author, "On Synchronized New Carrier Type", 3GPP TSG-RAN WG1 Meeting #72, R1-130126, ZTE, St. Julian's, Malta, Jan. 28-Feb. 1, 2013, pp. 1-3.

* cited by examiner

METHOD AND APPARATUS FOR BROADCASTING SYNCHRONIZATION SIGNALS AND SYSTEM INFORMATION IN A NEW TYPE CARRIER

TECHNICAL FIELD

The herein suggested solution relates to broadcast of information, in particular to broadcast of system information and synchronization signals, enabling access to an eNB, for an LTE New Carrier Type (NCT).

BACKGROUND

In LTE, broadcasted system information is vital for a User Equipment (UE) in order to access a cell. The initial system information, which the UE acquires, is transmitted in the so-called master information block (MIB), which is mapped to the so-called Physical Broadcast Channel (PBCH). The MIB contains information about the downlink (DL) system bandwidth, the radio frame number and the resources used for a Physical Hybrid-ARQ Indicator Channel (PHICH). This information is in turn used to acquire other system information blocks (SIBs), scheduled by the Physical Downlink Control Channel, PDCCH. The PBCH use cell specific reference signals for demodulation.

In 3GPP, a New Carrier Type (NCT) is being developed for Rel.12 LTE. The new carrier type does not carry cell specific reference signals for demodulation. Hence, the PBCH cannot be used to broadcast the system information. This is a technical problem, which is addressed by the herein suggested solution. For NCT, a special cell-specific reference signal (CRS) is introduced, which is transmitted only every 5th subframe and only for a single antenna port to aid the synchronization. This special CRS signal is therefore denoted enhanced synchronization signal (ESS) in this invention disclosure.

LTE uses OFDM (Orthogonal Frequency Division Multiplexing) in the downlink and DFT-spread OFDM in the uplink. The basic LTE downlink physical resource can thus be seen as a time-frequency grid as illustrated in FIG. 4, where each Resource Element (RE) corresponds to one OFDM subcarrier during one OFDM symbol interval.

In the time domain, LTE downlink transmissions are organized into radio frames of 10 ms, each radio frame consisting of ten equally-sized subframes of length Tsubframe=1 ms, as illustrated in FIG. 3.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair (RBP). Resource blocks are numbered in the frequency domain, starting with 0 from one end of the transmission bandwidth.

Transmission of System Information in LTE

In LTE, the initial system information, i.e. the master information block (MIB) is transmitted using the broadcast channel (BCH) and one BCH transport block is transmitted every 40 ms. For error protection, the BCH relies on a 16-bit CRC and the BCH channel coding is based on the same rate-⅓ tail-biting convolutional code as is used for the PDCCH control channel.

The coded BCH transport block is mapped to the first subframe of each frame in four consecutive radio frames. The BCH is transmitted within the first four OFDM symbols of the second slot of subframe 0 and only over the 72 center subcarriers (hence not on a resource block basis), except the DC (Direct Current) subcarrier. In the case of FDD, BCH follows immediately after the primary and secondary synchronization signals in the same subframe (PSS and SSS), subframe 0. The location of PSS, SSS and BCH is illustrated in FIG. 1, and the DC carrier is illustrated in FIG. 2.

From the decoded MIB, the terminal knows the actual downlink cell bandwidth and can set the receiver bandwidth accordingly. The MIB thus contain the following information:

Downlink system bandwidth—4 bits
PHICH configuration—3 bits
System Frame Number (SFN)

Problems with Existing Solutions

It is in general a problem how to access a cell during the presence of strong interference from an adjacent cell. Access is here defined as synchronization and acquiring of initial system information.

It is a problem how to broadcast initial system information corresponding to the MIB or equivalent to the MIB without relying on CRS for demodulation. An application of such operation is on the new carrier type where CRS is not present.

It is also a problem that system information transmissions collide between cells with aligned subframe numbers. An example is the heterogeneous scenario where macro cell and pico cell MIB transmissions collide. Hence, there is interference from MIB transmission in an adjacent cell that cannot be avoided by scheduling since the MIB transmission occurs at the same time and frequency location in the serving cell. This may also be the case for synchronization signals.

SUMMARY

The herein suggested solution comprises that the broadcast of system information, and/or synchronization signals, in a cell uses a time-frequency resource that is determined based on one or more properties of the detected synchronization signal(s). Such properties may include a symbol sequence(s) comprised in the synchronization signal(s), the time-frequency resources used for the synchronization signals(s) and/or the scrambling code used on the synchronization signal. This allows for inter-cell interference coordination of system information e.g. between cells with different cell identities. Since there are multiple candidate positions for the system information transmission according to the suggested solution, a base station may transmit the broadcast information in one of the multiple candidate positions and mute the remaining candidates to achieve better SINR for broadcast information reception.

Furthermore, multiple candidate positions of a synchronization signal can exist within a subframe which allows for intercell interference coordination also for the synchronization signals. Information about the position of the synchronization signal within the subframe (i.e. the subframe boundary synchronization) is then given by a property of the synchronization signal, such as a sequence comprised in the synchronization sequence. A base station may thus transmit the synchronization signal or signals in one of multiple candidate positions and mute the remaining candidates, in order to achieve better SINR for synchronization.

By use of the suggested solution, system information can be broadcasted without the use of cell specific reference signals and intercell interference coordination may be achieved. Furthermore intercell interference coordination may also be achieved for synchronization signals.

According to a first aspect, a method for broadcast is provided. The method is to be performed by a base station in a wireless communication network. The method comprises determining a set of transmission resources, out of a number of sets of transmission resources, based on a property associated with a synchronization signal of the base station, and further transmitting the synchronization signal and/or system information in the determined set of transmission resources.

According to a second aspect, a base station is provided for broadcast in a wireless communication network. The base station comprises a determining unit adapted to determine a set of transmission resources, out of a number of sets of transmission resources, based on a property associated with a synchronization signal of the base station. The base station further comprises a transmitting unit, adapted to transmit the synchronization signal and/or system information in the determined set of transmission resources.

According to a third aspect, a method is provided for receiving information broadcasted from a base station. The method is to be performed by a UE in a wireless communication network. The method comprises receiving a synchronization signal from the base station and determining a set of transmission resources, out of a number of sets of transmission resources, based on a property associated with the synchronization signal. The method further comprises performing at least one of: (i) determining a subframe boundary based on the determined set of transmission resources, when the determined set relates to the transmission resources of the synchronization signal; and (ii) receiving system information from the base station in the determined set of transmission resources, when the determined set relates to system information. According to a fourth aspect, a UE is provided for receiving information broadcasted from a base station in a wireless communication system. The UE comprises a receiving unit, adapted to receive a synchronization signal from the base station; and a determining unit, adapted to determine a set of transmission resources, out of a number of sets of transmission resources, based on a property associated with the synchronization signal. The UE is further adapted to perform at least one of: (i) determining a subframe boundary based on the determined set of transmission resources, when the determined set relates to the transmission resources of the synchronization signal; and (ii) receiving system information from the base station in the determined set of transmission resources, when the determined set relates to system information.

BRIEF DESCRIPTION OF THE DRAWINGS

The suggested technology will now be described in more detail by means of exemplifying embodiments and with reference to the accompanying drawings, in which.

DETAILED DESCRIPTION

Figure 1:
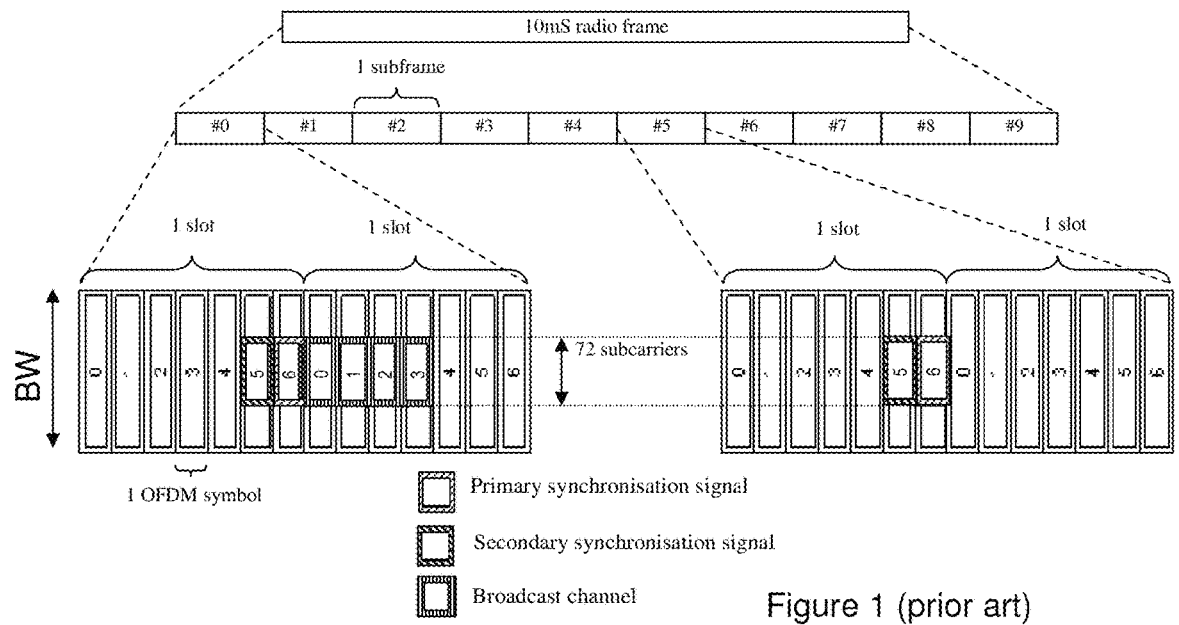
FIG. 1 illustrates the location of SSS, PSS and BCH in an LTE frame structure according to the prior art.
Figure 2:
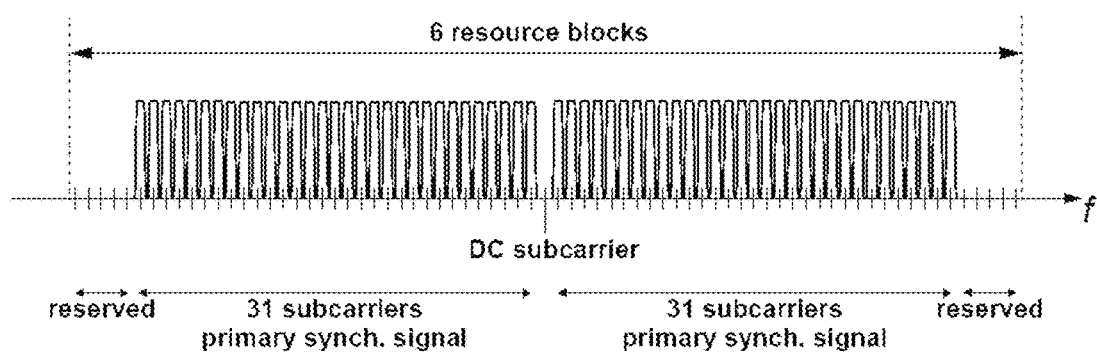
FIG. 2 illustrates the location of a PSS in terms of LTE subcarriers, according to the prior art.
Figure 3:
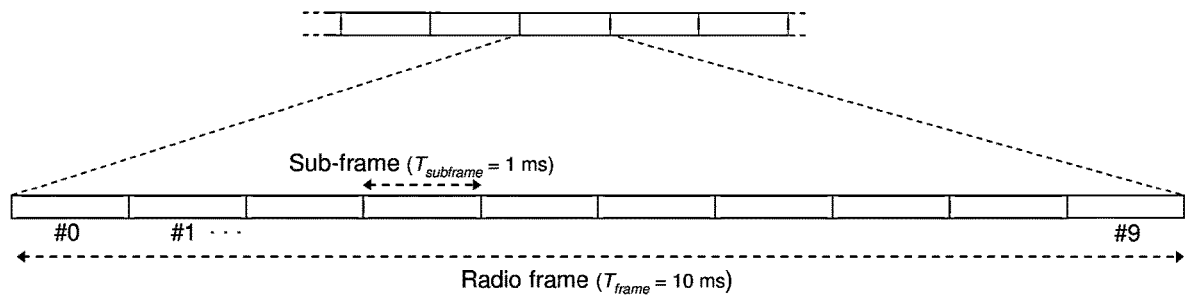
FIG. 3 illustrates an LTE time-domain structure according to the prior art.
Figure 4:
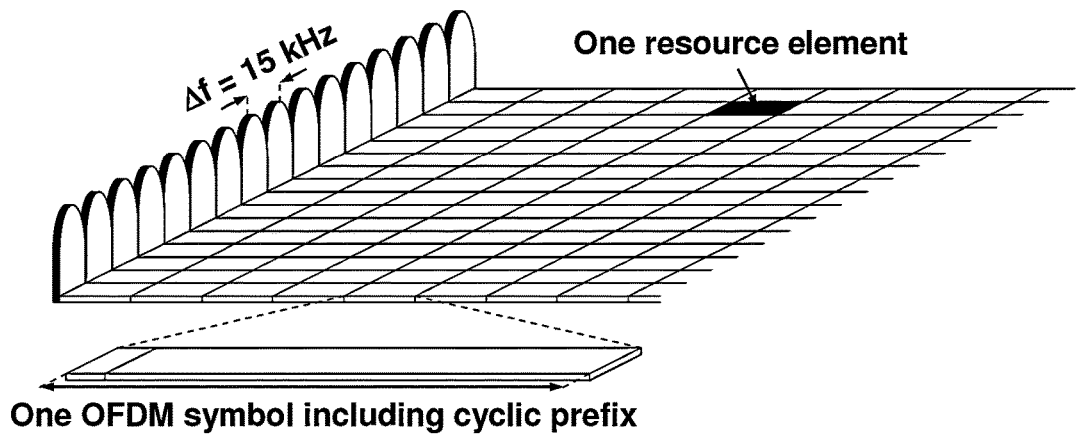
FIG. 4 illustrates an LTE downlink physical resource element according to the prior art.

When a UE connects to a cell of the new carrier type (NCT), it searches for the PSS/SSS and finds coarse synchronization. By the detected sequences of PSS and SSS, it acquires the Cell ID of the eNB it is synchronized to (3GPP TS 36.211, e.g section 6.11; TS 36.213, e.g. section 4). Then it may also search for the ESS to perform fine tuning of the synchronization.

If the NCT broadcasts initial system information, it can operate as a stand-alone cell, and a UE can be connected to only NCT cells without any simultaneous connection to legacy carrier types (LCT). There could also be situations where a UE is connected to both a LCT and a NCT and would benefit from detecting also the initial system information on the NCT.

In the following, consider a number of embodiments of the invention. The embodiments or parts thereof can be combined in various ways, according e.g. to requirements and/or preference.

The initial system information on the NCT is herein denoted an "enhanced master information block" (EMIB) and the physical channel that carries the EMIB is denoted "the EPBCH". The content of the EMIB is outside the scope of the herein suggested solution.

Herein, a solution for broadcast of information is described. The information which is broadcasted is information which contributes to enabling a UE to connect to a base station, i.e. synchronization signals such as PSS/SSS/ESS and/or system information such as MIB/EMIB. There is a principal difference between the receiving of these different types of information, and in order to facilitate the understanding of the different aspects of the suggested solution, an explanation of the difference between receiving synchronization signals and receiving system information will follow below:

When a UE receives the synchronization information, the frame boundaries of the frame structure used in the Radio Access Technology (RAT) in question are not known to the UE. That is, the UE receives and recognizes a synchronization signal from a base station, but does not know if the synchronization signal is located e.g. in the third OFDM symbol in the second slot in the fifth subframe (in case of LTE-type system). On the other hand, when the UE is to receive broadcasted system information, such as MIB, from the base station, the frame boundaries are known due to information derived from broadcasted synchronization signals.

A variant of the suggested solution relating to system information is perhaps the easiest to comprehend. In this case, a property of a received synchronization signal is indicative of the transmission resources where the system information will be found. The location of the synchronization signal may in this case be known to the UE, e.g. as in prior art solutions.

A variant of the suggested solution relating to synchronization signals is different in that a property of a received synchronization signal instead (or in addition) indicates where the received synchronization signal ("itself") is located in a frame structure, and thus the location of the frame boundaries in the frame structure may be derived by the UE. For example, the start of a radio frame and/or a certain subframe may be determined based on the property of the received synchronization signal. That is, the location, in a frame structure, of the received signal is determined after it has been received. Hopefully, this explanation helps in understanding the rest of the description.

In some of the embodiments described below, a reuse of an EPDCCH structure is discussed. A description of the EPDCCH structure may be found in an appendix to this detailed description, where it has been placed in order not to obscure the understanding of the suggested solution for broadcast. It should be noted that reuse of the structure of EPDCCH is just one of several alternatives for how to configure different sets of non-overlapping transmission resources. This alternative has the benefit of already being described in standard related documents, however in a quite different context, namely transmission of EPDCCH when a UE has already connected to a base station and thus accessed a cell. That is, when receiving the EPDCCH, the UE has already received synchronization signals and acquired initial system information.

Embodiment 1

In this embodiment, which relates to the EMIB detection, the EPBCH is transmitted within a subframe and within a bandwidth of L RBs (Resource Blocks), using the same structure as a distributed EPDCCH set with N≤L PRB pairs. If an NCT, like the LCT, supports the smallest LTE bandwidth of 6 RB, then L=6 also for higher system bandwidths, since the system bandwidth is unknown at the time of initially detecting the EPBCH.

Assuming L=6 in the following (although other values of L may be used if the NCT has a different solution than LCT, e.g., the smallest supported bandwidth is larger than L=6). Then inter-cell interference coordination is possible between two nodes that transmit EPBCH.

Figure 5:
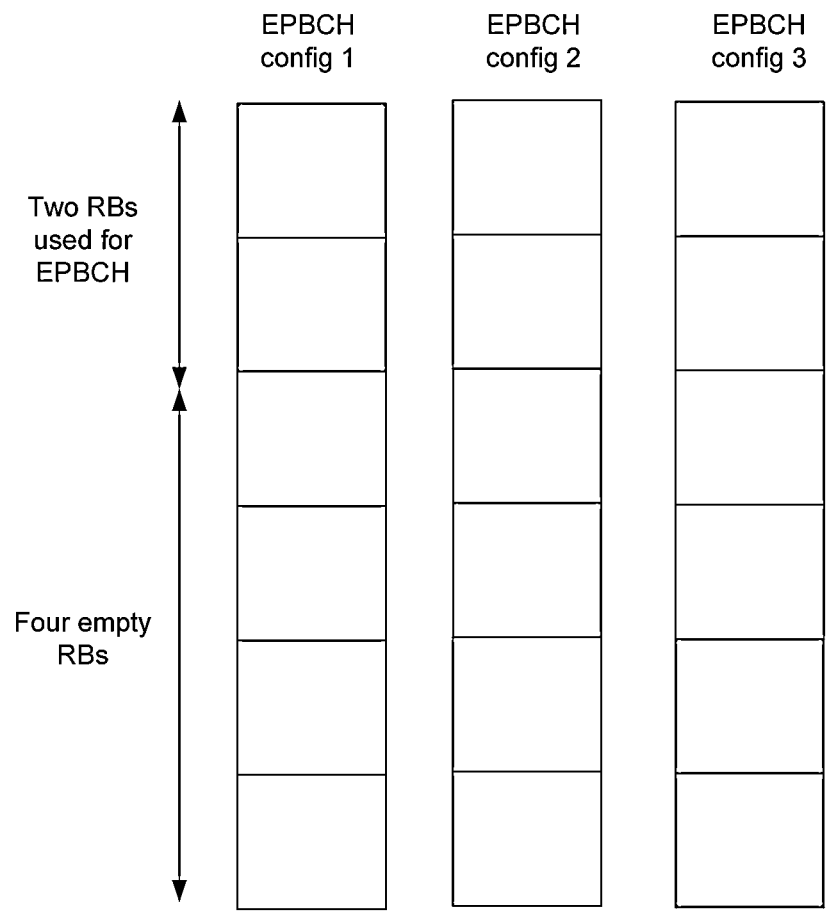
FIGS. 5-11 show different transmission resource configurations for broadcast of system information and/or synchronization signals.

For example, N=2 can be used where the selection of which two PRB pairs out of the six possible are used depends on the Cell ID, for instance using a modulo-3 operation, see FIG. 5. FIG. 5 illustrates three EPBCH (Evolved Physical Broadcast Channel) configurations in a bandwidth of L=6 RB. Alternatively, N=3 can be used and a modulo-2 operation on the Cell ID can be used to select one out of two possible sets of PRB pairs. Note that resources that are not used for EPBCH transmission in a cell should be muted, or at least use a transmission with lower transmit power, as to not interfere with the EPBCH transmission in an adjacent cell. Thereby the inter-cell interference coordination is achieved.

In a further embodiment, if interference coordination is not desirable, but maximal coverage is desirable, for instance when cells are very large, then all N=6 RBs can be used for EPBCH transmission. Hence, the distributed EPDCCH structure, which is used as an example for the EPBCH transmission in this embodiment, may be generalized to 6 RBs which is outside the Rel-11 set sizes of 2, 4 and 8 RB. Since all resources in all L RB are used, this disables interference coordination possibility but results in a very low code rate and hence a good error protection by the channel code.

If N<L, the separation between the N PRB pairs in an EPBCH can be chosen to be maximal within the L RB to maximize the frequency diversity. Alternatively, the N PRB pairs can be adjacent as in FIG. 5.

After synchronization, the UE shall then demodulate the EPBCH, which is mapped according to the same mapping as distributed EPDCCH with a pre-defined aggregation level, where the physical resource elements used by PSS, SSS and ESS are not available for the EPBCH transmission. The aggregation level can be specified in the standard to be the highest possible, for example aggregation level 8 for N=2 in the case of normal cyclic prefix length.

If the UE has detected the ESS used by the cell, the EPBCH is at least mapped around that cell's ESS. Moreover, to protect the EPBCH from interference due to ESS transmissions in adjacent cells, the EPBCH may instead be mapped around all possible ESS RE (including the multiple frequency shifts of the ESS RE).

The reference signal used for demodulation of EPBCH could be using the same DMRS positions as the one used for PDSCH and EPDCCH (see TS 36.211 section 6.10.3A. In particular, as it is beneficial to utilize antenna diversity for the EPBC, one can re-use the same DMRS and association between REs and antenna ports as used for distributed EPDCCH mapping, i.e. antenna port number 107 and 109 (for more information on specific antenna ports see appendix to detailed description and TS36.211 section 6.10.3A.2 where the mapping to resource elements is described. For EPDCCH distributed mapping, and also as proposed here, for EPBCH, every other RE in the physical resource grid is associated with one of the two antenna ports alternatively, similar to the distributed EPDCCH. Hence, when performing demodulation at the UE of the EPBCH, the UE shall use the channel estimates from one or the other antenna port in an alternating manner. In this way antenna diversity is achieved for the EPBCH.

Furthermore, bundling can be assumed with respect to the antenna ports. This means, that the UE may assume during channel estimation that an antenna port in one of the N PRB pairs used for the EPBCH transmission is the same as the corresponding antenna port in another RB used by the EPBCH within the L RB. Hence, the UE can interpolate the channel estimate across the RB used by the EPBCH to improve the channel estimation performance.

In a further embodiment, the PSS and SSS are not transmitted at their legacy positions (cf. FIG. 1) within the subframe, due to the collisions with the DMRS, but moved so that DMRS in slot n does not collide with the PSS or SSS. In this case the DMRS in both slots can be used to demodulate the EPBCH. Alternatively, the PSS and SSS remains at their legacy positions but the DMRS is moved earlier in the slot, or completely removed from slot n for those PRB pairs that collide with PSS and SSS, as shown in FIG. 6, so that they do not collide with PSS, SSS.

Figure 6:
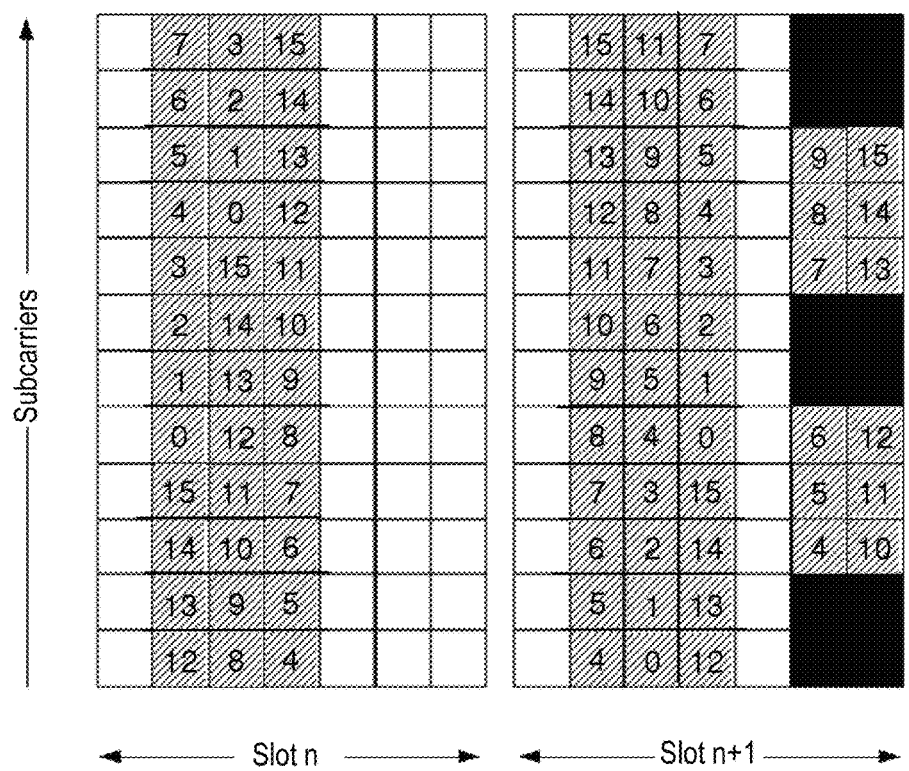

FIG. 6 shows a mapping of EPBCH to available resources (shaded REs) corresponding to EREG 0-15. In this figure, the REs corresponding to PSS, SSS and all shifts of ESS (Enhanced Synchronization signal) (antenna port 0) are not available for EPBCH mapping (white REs). Only DMRS (black REs) in slot n+1 are available as a reference signal for demodulation. 84 REs are thus available in a PRB pair for EPBCH transmission and if N=2 PRB pairs are used, there are 168 RE available for EPBCH in total.

In a yet a further embodiment, the DMRS is not used as a reference signal for the EPBCH, although the EPDCCH structure is used. Instead the PSS and/or SSS and/or ESS are used as a reference signal to demodulate the EPBCH. If two antenna ports are needed to achieve transmit diversity for EPBCH, then at least two different antenna ports can be assigned to at least two different synchronization signals. For example, the PSS and SSS could serve as a reference signal for a first antenna port and ESS the reference signal for the second antenna port, where the first and second port are used to demodulate EPBCH using antenna diversity transmission. Alternatively, PSS could be the reference for this first antenna port and SSS the reference for the second antenna port. Since in this embodiment, the RE occupied by the DMRS are not used, these RE can instead be used for EPBCH transmission.

Embodiment 2

This embodiment is a variant on embodiment 1, where all L=6 RB (other values of L are, however, not precluded) are allocated to EPBCH and the distributed EPDCCH structure is used. The L=6 PRB pairs contain 24 ECCEs (Enhanced Control Channel Elements) in normal cyclic prefix case but also other combinations of the EREGs (Enhanced Resource Element Groups) are possible to arrive at a fewer or more than 24 ECCEs. An example is 12 ECCEs. The Cell ID can then be used to indicate which subset of these 24 ECCEs that contains the EPBCH. Hence, in this embodiment, an EPBCH is mapped to all L PRB pairs.

For example, there may be 3 EPBCH candidates of size 8 ECCEs each. The Cell ID modulo-3 indicates which of these 3 non-overlapping sets of ECCEs that contains the EPBCH for the cell. An adjacent cell (base station) can then be configured with a different Cell ID, selected such that non-overlapping ECCEs will be used for the EPBCH in the adjacent cells when using e.g. a modulo-3 operation to determine the set. That is, modulo-3 Cell ID_1 should take on a different value than modulo-3 Cell ID_2.

Figure 7:
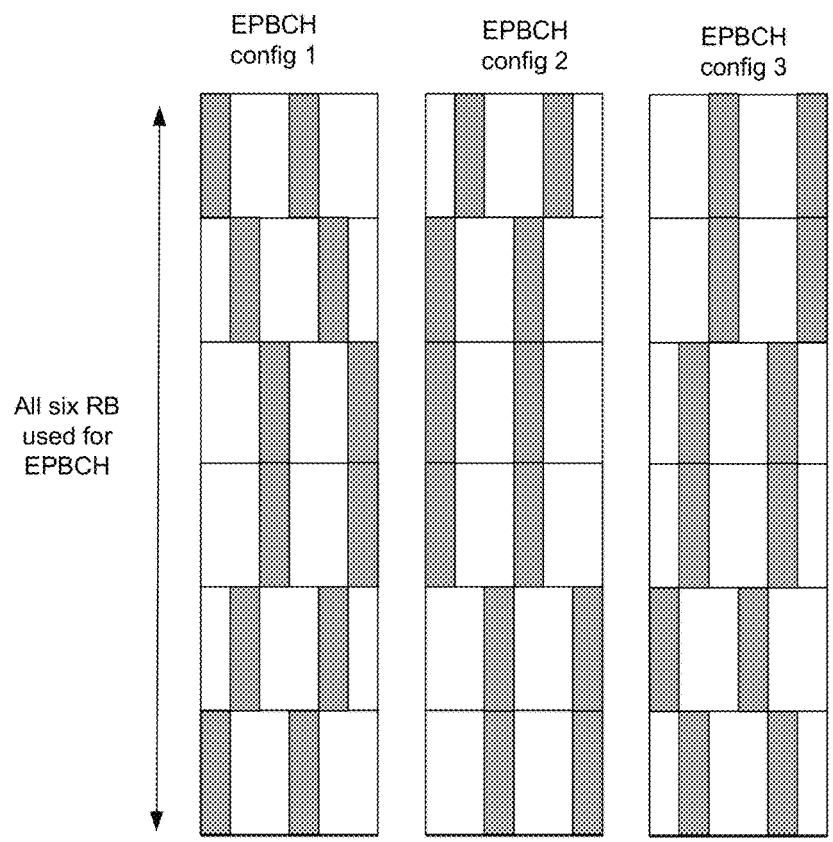

This embodiment is not restricted to the exact structure specified for EPDCCH as other rules on how to map the modulated symbols to physical resource elements may be employed as well, using the principle with different configurations having non-overlapping resources. FIG. 7 illustrates an example of three configurations with non-overlapping resource allocations. FIG. 7 shows an example where all 6 RB are used for the EPBCH transmission but where in each RB only a fraction of the resource elements are used for EPBCH transmission (gray) in the cell and the remaining RE are empty (white) to allow for inter-cell interference coordination of EPBCH.

The scrambling of the DMRS in the PRB pairs containing EPBCH and used for EPBCH demodulation is in a further embodiment also obtained from the Cell ID so that different cells, which have overlapping DMRS for their EPBCH transmissions have reduced interference on their DMRS.

In a further embodiment, the UE may assume that the antenna ports of the L=6 PRB pairs are the same so that the channel can be interpolated between the different PRB pairs (PRB bundling).

In a further embodiment, there are 2 EPBCH candidates of size 12 ECCEs each. The Cell ID modulo-2 selects which one to use for EPBCH in the cell. The two candidates use orthogonal antenna ports. This can be obtained by using the same DMRS scrambling but use code division multiplexed antenna ports. For instance EPBCH#0 can use antenna ports 107+109 (same as distributed EPDCCH) while EPBCH#1 use antenna ports 108+110 (which are currently unused for a distributed EPDCCH set).

In a further embodiment, the EMIB data scrambling is also dependent on the Cell ID and/or the used ECCEs (i.e., the used physical resources).

Figure 8:
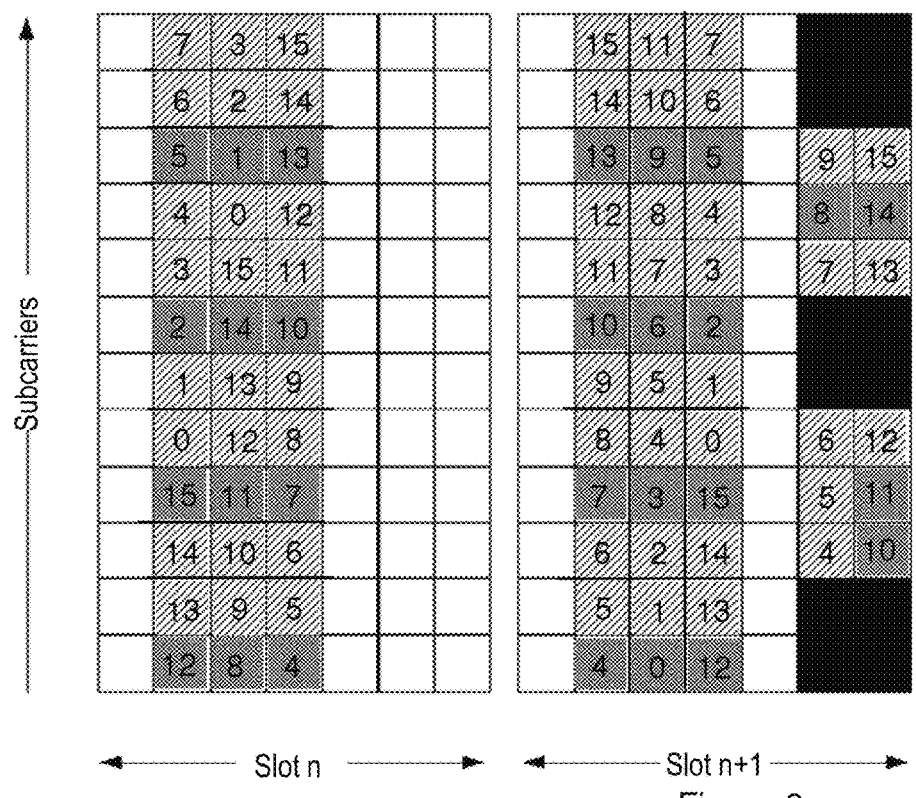

FIG. 8 shows an example where ⅓ of all available REs in a PRB pair are used for EPBCH transmission and the remaining ones are empty. This means that another cell may use that empty REs for its EPBCH transmission. The selection of the available and empty REs in FIG. 8 is just an example. In FIG. 8, all L=6 PRB pairs are used for EPBCH transmission. In this example, the black resource elements denote the DMRS positions, the light gray are unused REs, the dark gray are the REs used for EPBCH transmission in this cell, and the white REs are used for other signals such as PSS, SSS and ESS. The unused REs are used by another cell for EPBCH transmission.

Embodiment 3

In this exemplifying embodiment, the structure of a distributed EPDCCH set may be reused for the purpose of EPBCH transmission, but the EPBCH is transmitted in a different subframe than the PSS and/or SSS and/or ESS. This has the advantage that more REs are available in the EPBCH for RE mapping procedure, and the coverage is thus improved. It also has an advantage that potential collisions with DMRS for EPBCH and PSS or SSS are avoided.

The subframe where EPBCH is located can either be fixed relative the PSS and/or SSS subframe or it can be indicated e.g. by the Cell ID. Different Cell ID could therefore generate different locations for the EPBCH of this cell. For example a Cell ID modulo-3 operation could be used to indicate an offset of 1, 2 or 3 subframes with respect to the subframe where the UE finds the PSS or SSS.

Figure 9:
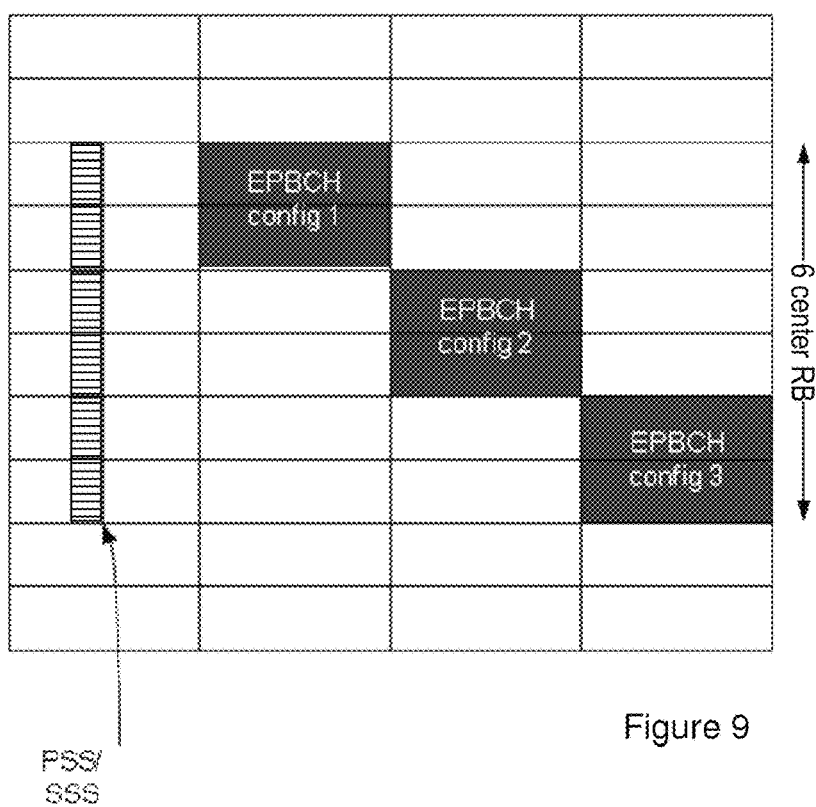

As in embodiment 1, e.g. the Cell ID can additionally be used to indicate a subset of N RBs out of the L RBs where the EPBCH is located, see FIG. 9. This enables a larger set of possible EPBCH locations and could be used if a large reuse factor of EPBCH resources is desired. FIG. 9 shows an example where PSS/SSS are positioned in subframe n and three possible EPBCH locations are shown where subframe offsets corresponding to subframe n+1, n+2 and n+3 have been used respectively. In each subframe, 2 out of 6 RBs are used for the EPBCH. The remaining 6 EPBCH candidates in these three possible subframes are not shown in this figure.

Alternatively, as exemplified in embodiment 2, an EPBCH may be mapped to all L PRB pairs, but the Cell ID points out which ECCEs that contain the EPBCH. A further embodiment is that 24 ECCEs is always used and only the subframe offset method in this embodiment 3 is used to coordinate EPBCH transmissions between cells that are interfering with each other.

Figure 11:
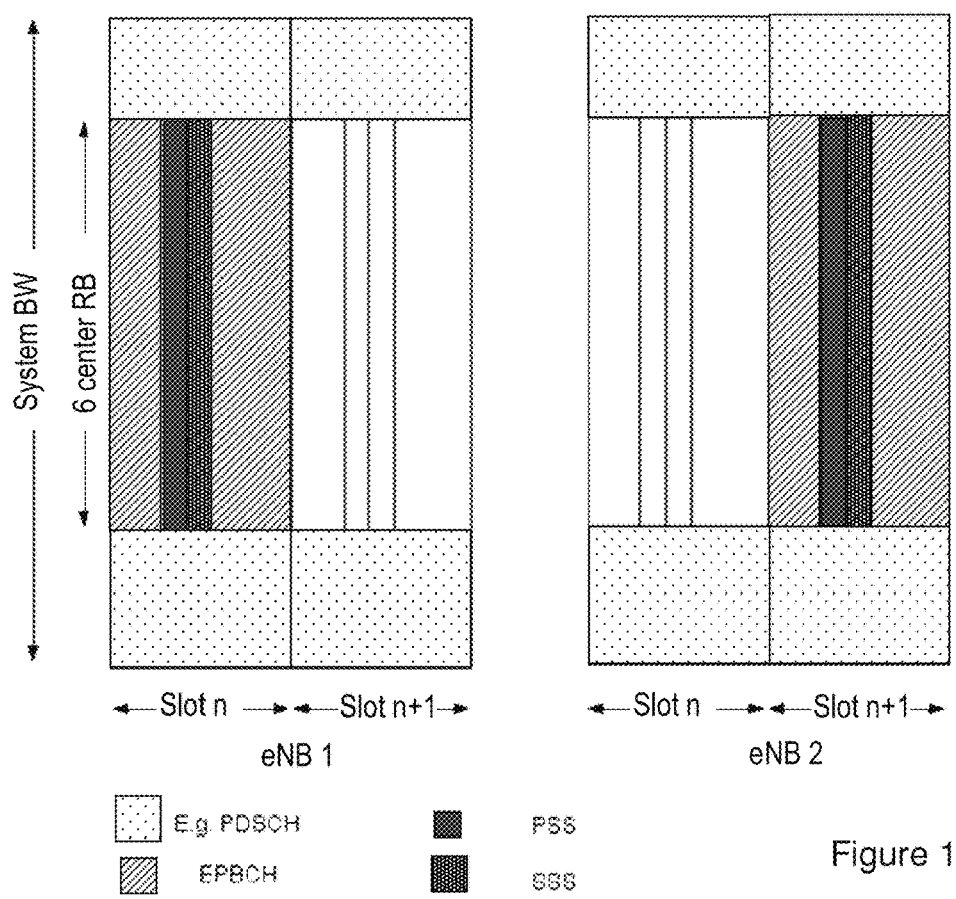

FIG. 11 shows an example of creating a reuse of a factor two for both EPBCH, i.e. the channel on which system information is transmitted, and transmissions of synchronization signals PSS/SSS within the center 6 RB. As seen in the FIG. 11, there are two possible positions for PSS/SSS and two possible for EPBCH. Hence, in a cell, only one of them is used and the reuse factor two is achieved. This can naturally be extended to larger reuse factors at the cost of additional overhead since unused positions in a cell cannot be used to transmit other signals. As an example, eNB1 and eNB2 could be a macro base station and a pico base station respectively. In slot n, eNB1 is transmitting while eNB2 is muted and vice versa. The properties of the PSS/SSS is different in slot n compared to slot n+1, so that the UE can detect the odd/even slot number upon cell search and thereby determine the subframe boundary. In this figure, the ESS is not shown, but reuse of two for ESS can also be achieved by frequency shifts.

Embodiment 4

This embodiment is a combination of embodiments 2 and 3, where both time and frequency offsets are used. The Cell ID, for example, points out a subframe offset and an RB offset to where the EPBCH is located in the cell. The RB offset can be larger than the 6 RB (in case the system bandwidth is larger than 6 RB).

Embodiment 5

This embodiment reuse the legacy PBCH in transmission structure, located in the center 6 RB, but with a subframe offset that is determined e.g. by the Cell ID. Hence, the EPBCH is not located in the same subframe as the PSS/SSS/ESS and the subframe offset depends on the Cell ID, which enables inter-cell coordination of EPBCH transmissions. In this case, the CRS needs to be transmitted locally, as a reference in the EPBCH demodulation. Hence, the EPBCH is mapped around 1, 2 or 4 CRS antenna ports with a frequency shift depending on the Cell ID. These CRS are only transmitted in the same 6 RB where EPBCH is mapped. As a further embodiment, these CRS are only transmitted in the $2^{nd}$ slot of the subframe and in the same RB where EPBCH is mapped.

Embodiment 6

In this embodiment, the location of the EPBCH is searched among a number of candidate positions by the UE. The search positions can be formulated as subframe offsets, OFDM symbol offsets, frequency offsets, or a combination thereof, relative the ESS, PSS or SSS.

In another variant the EPBCH candidate positions are given as different ECCE offsets in a set of PRB pairs which contains a larger number of ECCEs. For instance, there may be 24 ECCEs in the set of PRB pairs and one EPBCH is using 8 out of these 24 ECCEs. The UE then searches the three possible candidate positions within the 24 ECCEs. If the UE manages to decode the EPBCH, the position of the EPBCH is confirmed. The set of candidate positions could also be derived e.g. from the Cell ID. The eNB would in such a case then place the EPBCH according the same pattern of parameter settings as the one with which the UE searches after the EPBCH.

Embodiment 7

In this exemplifying embodiment, inter-cell interference coordination is achieved for both the EMIB and the synchronization signals. This is useful in case the UE is strongly interfered by another cell, such as a UE connected to a low power node being subjected to interference from communication in an adjacent high power node. In this embodiment a more general structure for the EPBCH transmission is assumed, not necessarily following the distributed EPDCCH structure.

The EPBCH is located in the same subframe as the ESS and is transmitted from the same antenna port in eNB; hence the UE can use the ESS as reference signal in the demodulation.

In another related embodiment the EPBCH is located in the same subframe as PSS and SSS. The demodulation of EPBCH may then be based on either the PSS or SSS as reference signal. Also in this case could ESS be used for demodulation of the EPBCH.

In those RBs where the EPBCH is transmitted, there is no DMRS transmitted. The REs that in a legacy system was used for DMRS could thus now be used for transmitting data as part of the EPBCH.

Furthermore, a combination of PSS and SSS could be used to obtain transmit diversity e.g. as in embodiment 1, where for example PSS/SSS provides a reference for one antenna port and ESS for the other antenna port. Alternatively, PSS provides the demodulation reference for the first antenna port and SSS the demodulation reference for the second antenna port.

The EPBCH structure is general in this embodiment. For example, it could reuse the legacy PBCH structure or could use the same structure as a distributed EPDCCH set or an alternative distribution.

Alternatively, a variant of reusing legacy structure is to let the EPBCH span four OFDM symbols (and L RB in bandwidth), for example symbol k, k+1, k+4, k+5, and let the PSS/SSS use OFDM symbols k+2, k+3, i.e., the PSS/SSS is surrounded by the EPBCH. The close proximity of the reference signals corresponding to PSS/SSS and the EPBCH would ensure high demodulation performance.

Figure 10:
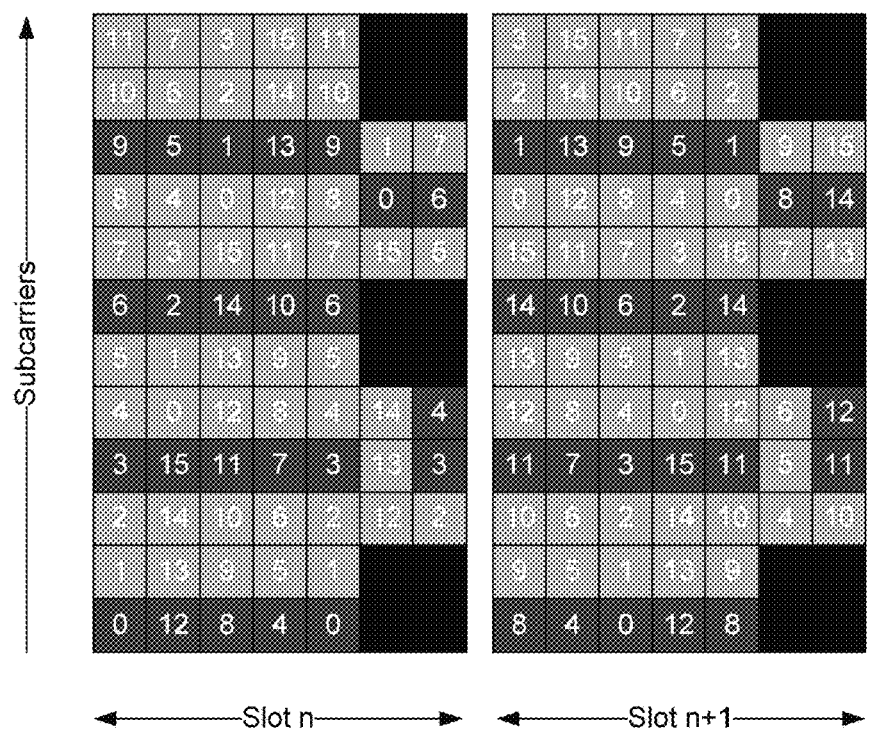

As a further embodiment, an OFDM symbol shift could be introduced to provide the PSS/SSS and EPBCH with re-use. Two orthogonal sets of PSS/SSS and EPBCH may for example be created by letting k be either 0 or 6, hence the EPBCH and PSS/SSS are transmitted in either slot n or slot n+1 and the rest of the subframe within the L RB is left empty to provide good SINR for the EPBCH and PSS/SSS transmission in the adjacent cell, see FIG. 10. FIG. 10 shows an example where not all REs are used and no PSS, SSS or ESS is transmitted in the same subframe due to the subframe offset. The available REs are divided into three regions so that 8 ECCE can be utilized in the case L=6 PRB pairs are used for EPBCH.

Which set (i.e. value of k) to use could be related to the sequences for PSS/SSS, including being a function of the Cell ID, possibly via a modulo operation. In other words, the UE would be able to infer the position of PSS/SSS and/or EPBCH within the subframe from a property of the detected PSS/SSS, such as the sequences it detects on the PSS/SSS. Note that at the point of PSS/SSS detection during cell search, the subframe boundaries are not known to the UE, in general. Hence, the position of the PSS/SSS within the subframe is obtained from properties of the PSS/SSS itself such as the sequence.

Note that the center L RBs, where nominally L=6 does not need to contain DMRS and thus these RE can be used for the EPBCH transmission. Alternatively, the EPBCH could be mapped around DMRS positions if it is deemed desirable to be able to map PDSCH transmission to the center six RBs. As discussed above, to enable inter-cell interference coordination, it should be possible to mute the time-frequency resources that are used for a PSS/SSS/EPBCH set, i.e., data may be mapped around the REs corresponding to a PSS/SSS/EPBCH set. In the example above this would entail muting either OFDM symbols 0-5 or 6-11 over the six center RBs in frequency. This enables for example orthogonal division of resources between a macro and a pico layer.

Below, a number of exemplifying embodiments of methods and apparatuses illustrating the suggested solution will be described with reference to FIGS. 12a-17 in a slightly more generalized manner. The previously, in detail, described embodiments, or parts thereof, are applicable to the embodiments described below, where appropriate.

Figure 12A:
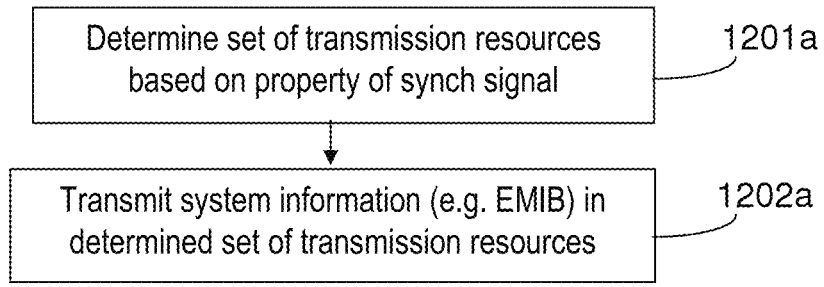
FIGS. 12a-12c are flow charts illustrating exemplifying procedures to be performed by a base station according to exemplifying embodiments.

Exemplifying Method Performed by a Base Station FIG. 12a

FIG. 12a illustrates schematic actions of a method to be performed by a base station in a wireless communication network. The method comprises determining 1201a a set of transmission resources, out of a number of sets of transmission resources. For example, the transmission resources in the set of transmission resources may be time-frequency resource elements in an OFDM type of communication system. The number of sets of transmission resources are assumed to be preconfigured or predefined, e.g. such that the sets are non-overlapping. The set of transmission resources is determined based on a property associated with a synchronization signal of the base station. By property is here meant e.g. a symbol sequence comprised in the synchronization signal, such as a Cell ID; a scrambling code used on the synchronization signal or a transmission resource used for transmission of the synchronization signal. The synchronization signal could e.g. be one or more of PSS, SSS and ESS. The method in FIG. 12a further comprises transmitting 1202a system information in the determined set of transmission resources. By system information is here meant information such as the one comprised in a MIB or EMIB, or some corresponding, differently denoted, information. (How the system information is denoted may be different in different systems.) The information should contribute to enabling a UE to connect to the base station.

In the method illustrated in FIG. 12a, it is assumed that the synchronization signal is transmitted (e.g. broadcasted at certain intervals) by the base station to be received by UEs which are to connect to the base station. When a UE has received the synchronization signal, it may determine where, i.e. in which transmission resources, the system information will be broadcasted by the base station and thus may be received by the UE.

Figure 12B:
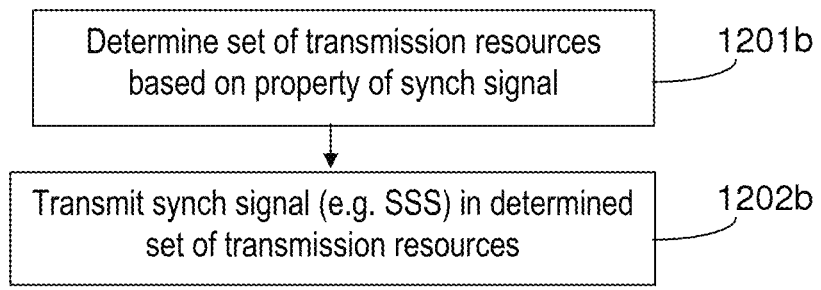

Exemplifying Method Performed by a Base Station FIG. 12b

As in FIG. 12a, the method comprises determining 1201b a set of transmission resources, out of a number of sets of transmission resources based on a property associated with a synchronization signal. In this example, however, it is not system information that is transmitted 1202b in the determined set of transmission resources, but instead one or more synchronization signals. For example one or more of the previously mentioned PSS, SSS and ESS. That is, it could be the same synchronization signal that is transmitted in the determined set of transmission resources as the one with which the property is associated.

As in the method illustrated in FIG. 12a, it is assumed in the method illustrated in FIG. 12b that the synchronization signal is transmitted (e.g. broadcasted at certain intervals) by the base station to be received by UEs which are to connect to the base station. A UE which receives the synchronization signal may then determine the frame boundaries of the frame structure of the radio access technology used in the wireless communication network. For example, it may be determined that the received synchronization signal is located in a certain set of resource elements in subframe 4 in the first slot of an LTE radio frame, and thus the receiving UE may determine where a radio frame starts or where the subframe or slot starts.

Figure 12C:
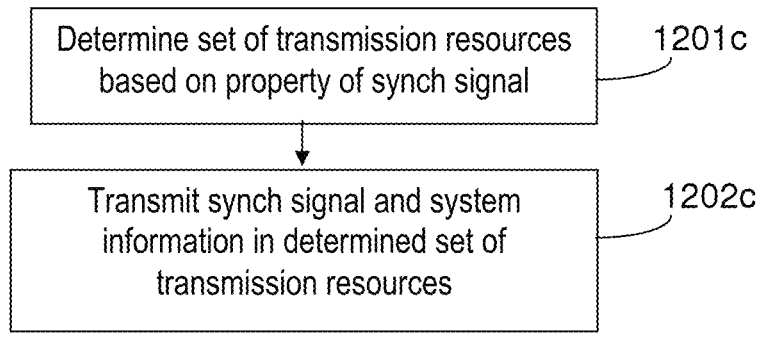

Exemplifying Method Performed by a Base Station FIG. 12c

As in FIGS. 12a and 12b, the method illustrated in FIG. 12c comprises determining 1201c a set of transmission resources, out of a number of sets of transmission resources based on a property associated with a synchronization signal. In this example, one or more synchronization signals and the system information are transmitted in the determined set of transmission resources. Thus, a UE receiving the synchronization signal may determine the frame boundaries of the radio frame structure and/or the subframe boundaries and the location, in said structure (i.e. in which transmission resources), of the system information, which may then be received by the UE.

In all three exemplifying methods above, the property associated with the synchronization signal is assumed to be a property which is configured to be different for adjacent base stations. As previously mentioned, the property may relate to e.g. a symbol sequence comprised in the synchronization signal such as a Cell ID, a scrambling code or a transmission resource used for transmission of the synchronization signal. For example, the determining criterion, e.g. the method for determining, may comprise performing a modulo operation on a symbol sequence number comprised in the synchronization signal, e.g. on the Cell ID, thus deriving a number e.g. 0, 1 or 2 in case of modulo-3. Each number 0-2 could be configured or predefined to correspond to one of the sets in the number of sets of transmission resources. Alternatively, when the property relates to a scrambling code, there may be a configured correspondence or matching/mapping, e.g. expressed in a mapping table or other matching scheme, provided to and stored in the base station and UEs, between a number of scrambling codes, or parts thereof, and a respective set of transmission resources from amongst the number of (candidate) sets of transmission resources. Accordingly, there may be a similar correspondence or matching/mapping between different transmission resources (in which a synchronization signal is received) and a respective set of transmission resources from amongst the number of sets of transmission resources.

For example, a UE may try receiving transmissions from the base station by trying to descramble using a number of different scrambling codes, e.g. codes X, Y and Z, which are each associated with a respective set of transmission resources. When the UE succeeds in receiving a synchronization signal when using one of the scrambling codes, e.g. Y, the UE may determine the frame boundaries and/or the set of resources in which to receive system information based on the fact that it was scrambling code Y that was used to scramble the synchronization signal.

The above methods involve determining a set of transmission resources from a number of sets of transmission resources based on a property associated with a synchronization signal, which property is configured to be different in adjacent cells. This enables that different sets of transmission resources from the number of sets of transmission resources may be determined or selected in (by) adjacent base stations. If the sets of transmission resources are configured to be orthogonal in one or more dimensions, such as time and frequency, this may be very useful for providing ICIC. For example, if a first base station determines a first set of transmission resources for broadcasting system information, this means that an adjacent base station will determine another set out of the number of sets, and thus the broadcasts of system information in the adjacent base stations will not interfere with each other. The ICIC is equally applicable to the cases when the synchronization signal is transmitted in the determined set of transmission resources. The remaining sets of transmission resources, i.e. the sets of the number of candidate sets which are not determined and used by the base station, not used for transmitting of the synchronization signal and/or system information by the base station may be allocated zero power by the base station, thus reducing interference to adjacent cells/base stations using these other sets of transmission resources.

As previously described, the distribution of the transmission resources in the different sets may be configured in different ways, cf FIGS. 5-11. For example the resources may be arranged in the same way as for an EPDCCH candidate. That is, the transmission resources may be distributed in a frame structure, e.g. an LTE subframe, in correspondence with the distribution used for an EPDCCH candidate. The determined set of transmission resources may be positioned in a different subframe than the synchronization signal when the determined set relates to system information. The herein suggested solution has the best effect with ICIC if the different sets of transmission resources are orthogonal, i.e. non-overlapping, in at least one dimension, such as time, frequency or code, but solutions where the sets are not entirely orthogonal are also possible.

Further, a second set of transmission resources, from out of a second number of sets of transmission resources may be determined by the base station. The second set of transmission resources may be determined based on the same property as the first set, or based on a different property associated with a synchronization signal of the base station. That is, the property could be associated with the same synchronization signal as for the first set, but could alternatively or in addition be associated with another synchronization signal (cf. PSS, SSS, ESS, etc.). In this example, the synchronization signal or signals could be transmitted in one of the first and second set of transmission resources, and the system information could be transmitted in the other set. In a preferred embodiment, the sets in the second number of sets of transmission resources are orthogonal to each other. The sets in the second number of sets of transmission resources could further be orthogonal to the sets in the first number of sets of transmission resources, thus enabling e.g. efficient ICIC.

Figure 13:
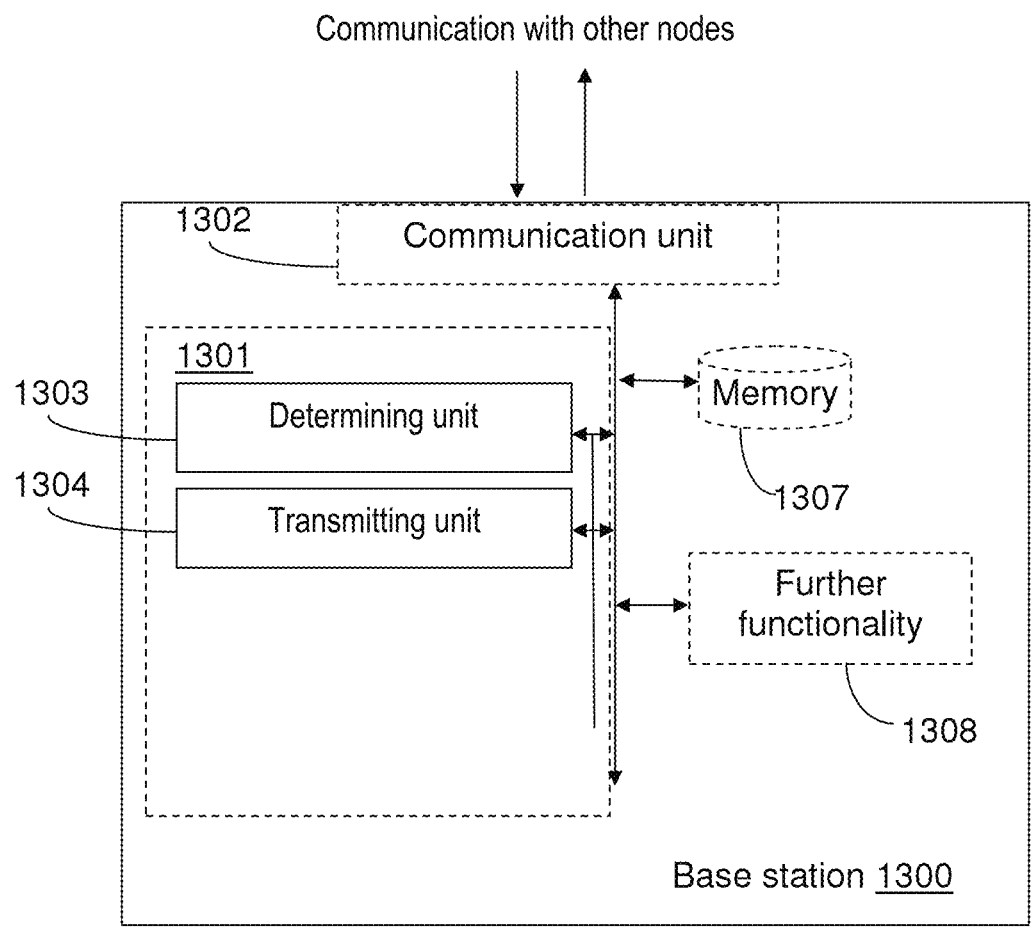
FIG. 13 is a block chart illustrating a base station according to an exemplifying embodiment.

Exemplifying Base Station, FIG. 13

Below, an exemplifying base station 1300, such as an eNB, which is adapted to enable the performance of one or more of the above described procedures, will be described with reference to FIG. 13. The base station 1300 is suitable for broadcast in a wireless communication network, such as e.g. an LTE-type network.

The base station 1300 is illustrated as to communicate with other entities via a communication unit 1302, which may be considered to comprise means for wireless uplink and downlink communication. Parts of the base station which are adapted to enable the performance of one or more of the above described procedures are illustrated as an arrangement 1301, surrounded by a dashed line. The arrangement and/or base station may further comprise other functional units 1308, for providing e.g. regular base station functions, such as scheduling and various types of signal processing. The arrangement and/or base station may further comprise one or more storage units 1307.

The arrangement 1301 could be implemented by processing circuitry, e.g. by one or more of: a processor or a micro processor and adequate software and storage therefore, a Programmable Logic Device (PLD) or other electronic component(s)/processing circuit(s) configured to perform the actions mentioned above in conjunction with FIGS. 12a-12c.

The arrangement part of the base station may be implemented and/or described as follows:

The base station comprises a determining unit 1303, adapted to determine a set of transmission resources, out of a number of sets of transmission resources, based on a property associated with a synchronization signal of the base station. The synchronization signal could be one or more of a PSS, an SSS and an ESS, as previously described. The base station further comprises a transmitting unit 1304, adapted to transmit system information in the determined set of transmission resources.

In order to avoid unnecessary repetition, the different embodiments of a base station are only described in brief herein. Embodiments of the base station may be assumed to have the same objects and advantages as the previously described method performed by a base station for broadcast in a wireless communication system. The base station, e.g. one or more of the functional units described above or some other functional unit or units, may be assumed to be adapted such that the different embodiments of the described method may be performed.

Figure 14A:
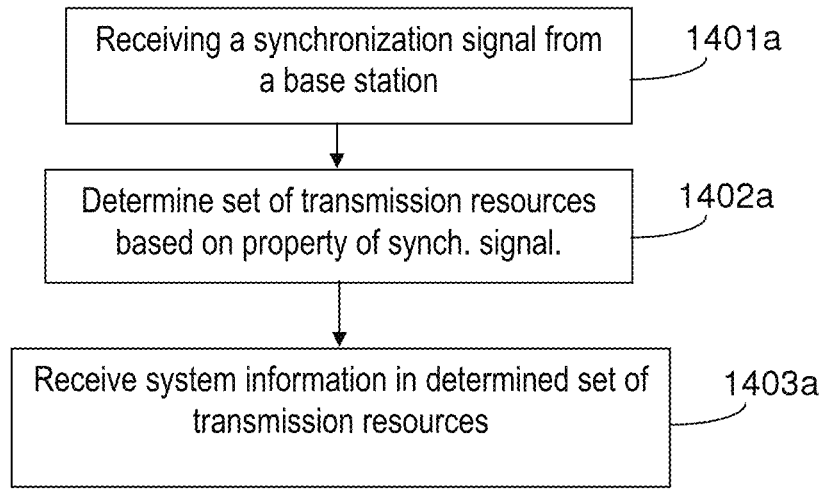
FIGS. 14a and 14b are flow charts illustrating exemplifying procedures to be performed by a UE according to exemplifying embodiments.

Exemplifying Method Performed by a UE, FIG. 14a

FIG. 14a illustrates schematic actions of a method to be performed by a UE in a wireless communication network. The UE shall connect to a base station (if possible), and does therefore need access to synchronization signals and system information broadcasted from the base station in question. The method comprises receiving 1401a a synchronization signal from the base station. The method further comprises determining 1402a a set of transmission resources, out of a number of sets of transmission resources, based on a property associated with the received synchronization signal. The number of sets of transmission resources are assumed to be preconfigured or predefined, e.g. such that the sets are non-overlapping. The set of transmission resources is determined, by the UE, based on a property associated with the synchronization signal of the base station. By property and synchronization signal is here meant the same as previously described.

The method in FIG. 14a further comprises receiving 1403a system information from the base station in the determined set of transmission resources. By system information is here meant e.g. information such as the one comprised in a MIB or EMIB, as previously described. That is, when the UE has received the synchronization signal, it may determine where, i.e. in which transmission resources, the system information will be broadcasted by the base station and thus be received by the UE.

Figure 14B:
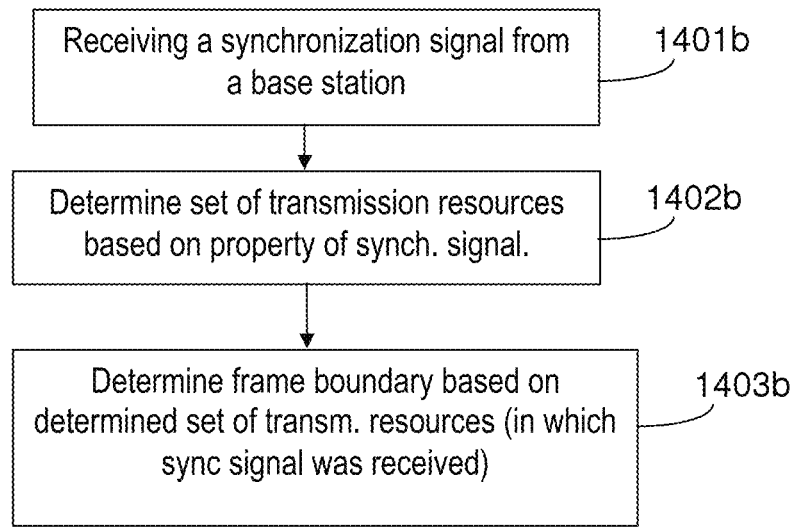

Exemplifying Method Performed by a UE, FIG. 14b

The method illustrated in FIG. 14b resembles the method described in FIG. 14a in that a synchronization signal is received 1401b, and a set of transmission resources is determined 1402b based on a property of the received synchronization signal. In this case, however, it is not the transmission resources associated with broadcasted system information that are determined, but the very resources in which the synchronization signal is transmitted. This may appear strange, but, even though the UE knows when, in absolute time, the synchronization signal was received, it does not know where, in a frame structure associated with the base station, the received signal is located. Thus, the method illustrated in FIG. 14b comprises determining, 1403b, a subframe boundary based on the determined set of transmission resources. A frame boundary is also considered to be a subframe boundary in this context, namely the boundary between the last subframe of one radio frame and the first subframe of the next radio frame.

In an alternative embodiment, the determined set may relate to both synchronization signal and system information, i.e. both the frame boundaries and the location (transmission resources) of the system information may be derived based on a property of the synchronization signal. This embodiment is, however, not illustrated.

The different possible implementations and embodiments of the methods described above correspond to the embodiments described above in association with the methods performed by a base station. That is, the property may relate to one or more of a symbol sequence, such as a Cell ID, comprised in the synchronization signal; a scrambling code used on the synchronization signal; and a transmission resource used for transmission of the synchronization signal. The latter is relevant for determining a transmission resources when frame boundaries are known, such as for receiving of broadcast of system information. Naturally, the frame boundaries may be determined based on a property of the synchronization signal, and then the location of transmission resources of the synchronization signal, in the determined frame structure, may be indicative of the location, in the frame structure, of the transmission resources in which the system information is broadcasted.

The determining based on the property may be performed in the same or a corresponding manner as in the base station described above, and may thus comprise e.g. performing a modulo operation on a symbol sequence number, such as a Cell ID, comprised in the synchronization signal. The determining may alternatively or in addition comprise matching of the scrambling code used on the synchronization signal, or of the transmission resources used for transmission of the synchronization signal, to a set of transmission resources, by use of a mapping table or other interpretation or matching scheme, which is assumed to have been made available to the UE in a therefore suitable manner.

Further, a second set of transmission resources may be determined by the UE based on a property associated with the synchronization signal. This property may be the property, based on which the first set of transmission resources was determined, or another property. The property may further be associated with the same synchronization signal, e.g. SSS, as the property based on which the first set was determined, or, it may be associated with another synchronization signal, e.g. ESS. For example, the scrambling code used on the PSS may be used in order to determine the first set of transmission resources and thus the frame boundaries, and a sequence number comprised in the SSS may be used in order to determine the second set of transmission parameters in which the system information may be received. That is, a subframe boundary may be determinded based on one of the determined first and second set of transmission resources, and system information may be received in the other determined set of transmission resources.

Figure 15:
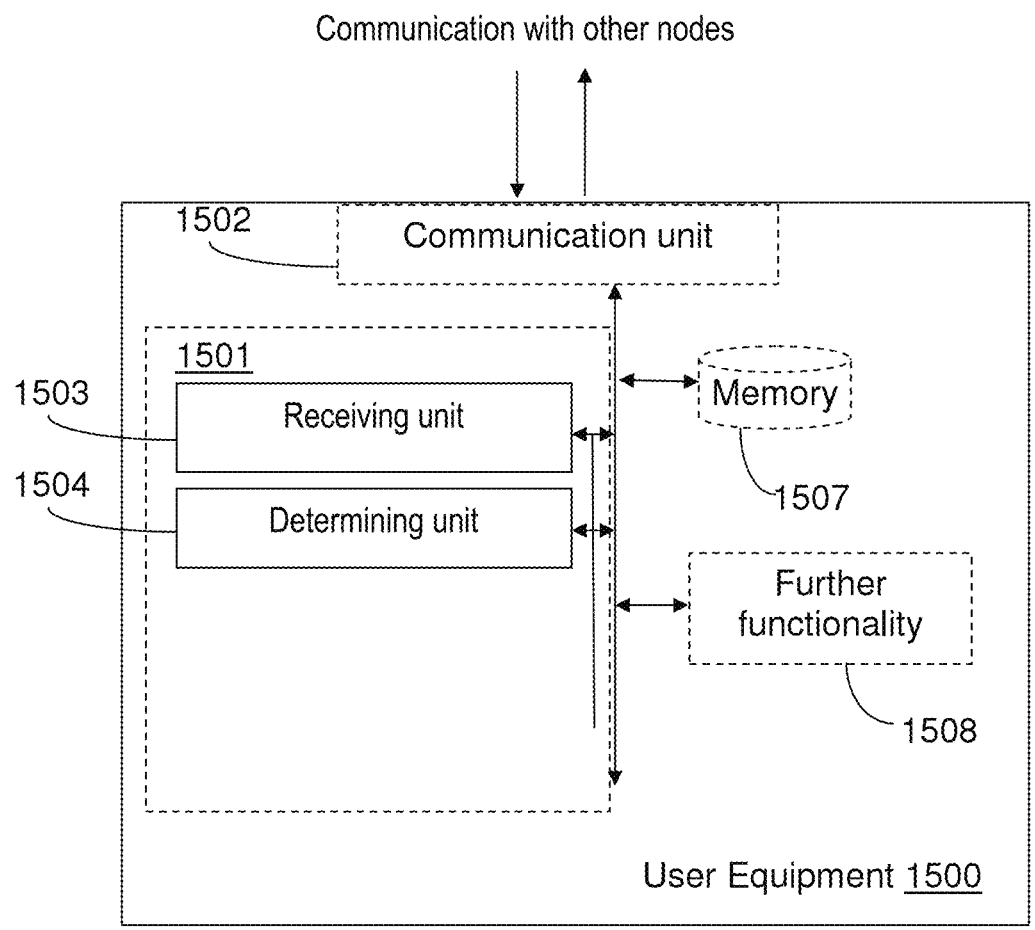
FIG. 15 is a block chart illustrating a UE according to an exemplifying embodiment.

Exemplifying UE, FIG. 15

Below, an exemplifying UE 1500, such as an eNB, which is adapted to enable the performance of one or more of the above described procedures, will be described with reference to FIG. 15. The UE 1500 is suitable for receiving broadcast from a base station in a wireless communication network, such as e.g. an LTE-type network.

The UE 1500 is illustrated as to communicate with other entities via a communication unit 1502, which may be considered to comprise means for wireless uplink and downlink communication. Parts of the UE which are adapted to enable the performance of one or more of the above described methods are illustrated as an arrangement 1501, surrounded by a dashed line. The arrangement and/or UE may further comprise other functional units 1508, for providing e.g. regular UE functions, such as channel measurements and various types of signal processing. The arrangement and/or UE may further comprise one or more storage units 1507.

The arrangement 1501 could be implemented by processing circuitry, e.g. by one or more of: a processor or a micro processor and adequate software and storage therefore, a Programmable Logic Device (PLD) or other electronic component(s)/processing circuit(s) configured to perform e.g. the actions mentioned above in conjunction with FIGS. 14a-14b.

The arrangement part of the UE may be implemented and/or described as follows:

The UE comprises a receiving unit 1503, adapted to receive a synchronization signal from the base station. The UE further comprises a determining unit 1504, adapted to determine a set of transmission resources, out of a number of sets of transmission resources, based on a property associated with the received synchronization signal. The UE 1500, e.g. the determining unit 1504, is further adapted to determine a subframe boundary based on the determined set of transmission resources, when the determined set relates to transmission resources of the synchronization signal, and/or adapted to, e.g. the receiving unit 1503, to receiving system information, such as a MIB or EMIB, from the base station in the determined set of transmission resources, when the determined set relates to system information.

In order to avoid unnecessary repetition, the different embodiments of a UE are only described in brief herein. Embodiments of the UE may be assumed to have the same objects and advantages as the previously described method for receiving of broadcast in a wireless communication system, and further to correspond to the previously described functions in a base station, with the necessary changes having been made in regard of transmission/reception. The base station, e.g. one or more of the functional units described above or some other functional unit or units, may be assumed to be adapted such that the different embodiments of the method may be performed.

Figure 16:
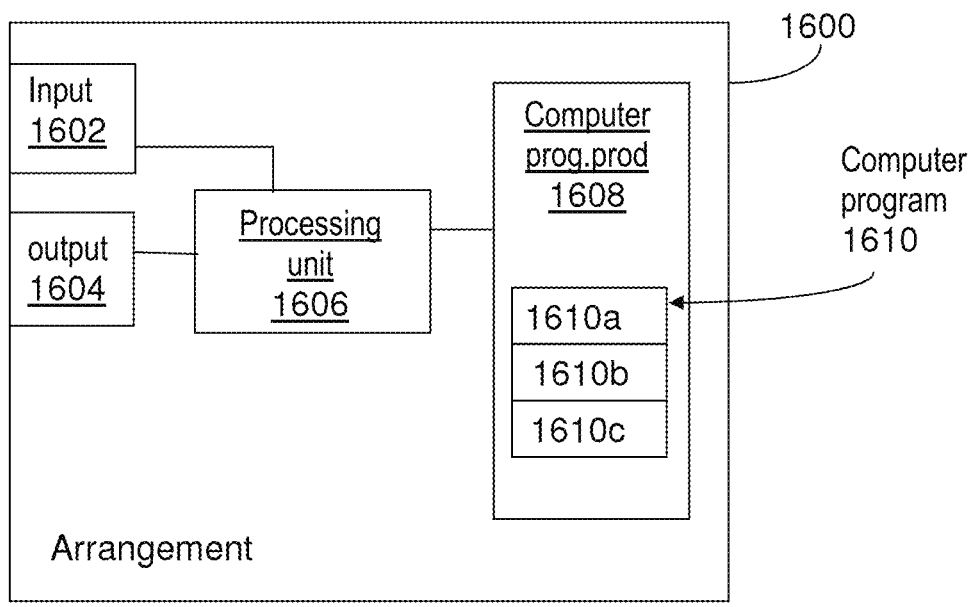
FIGS. 16-17 are block charts illustrating arrangements according to exemplifying embodiments.

Exemplifying Computer Implemented Embodiment, FIG. 16.

FIG. 16 schematically shows a possible embodiment of an arrangement 1600, which also can be an alternative way of disclosing an embodiment of the arrangement 1301 illustrated in FIG. 13. Comprised in the arrangement 1600 are here a processing unit 1606, e.g. with a DSP (Digital Signal Processor). The processing unit 1606 may be a single unit or a plurality of units to perform different actions of procedures described herein. The arrangement 1600 may also comprise an input unit 1602 for receiving signals from other entities, and an output unit 1604 for providing signal(s) to other entities. The input unit 1602 and the output unit 1604 may be arranged as an integrated entity.

Furthermore, the arrangement 1600 comprises at least one computer program product 1608 in the form of a non-volatile or volatile memory, e.g. an EEPROM (Electrically Erasable Programmable Read-Only Memory), a flash memory and/or a hard drive. The computer program product 1608 comprises a computer program 1610, which comprises code means, which when executed in the processing unit 1606 in the arrangement 1600 causes the arrangement and/or a node in which the arrangement is comprised to perform the actions e.g. of the procedures described earlier in conjunction with FIG. 12a-12c.

The computer program 1610 may be configured as a computer program code structured in computer program modules. Hence, in an exemplifying embodiment for use in a base station, the code means in the computer program 1610 of the arrangement 1600 may comprise a determining module 1610a for determining a set of transmission resources, out of a number of sets of transmission resources, based on a property associated with a synchronization signal of the base station. The computer program 1610 may further comprise a transmitting module 1610b, for transmitting the synchronization signal and/or system information in the determined set of transmission resources. The computer program may further comprise additional computer program modules, illustrated by 1610c, adapted to provide some or all of the different actions of the embodiments described above in conjunction with the procedure in a base station.

Figure 17:
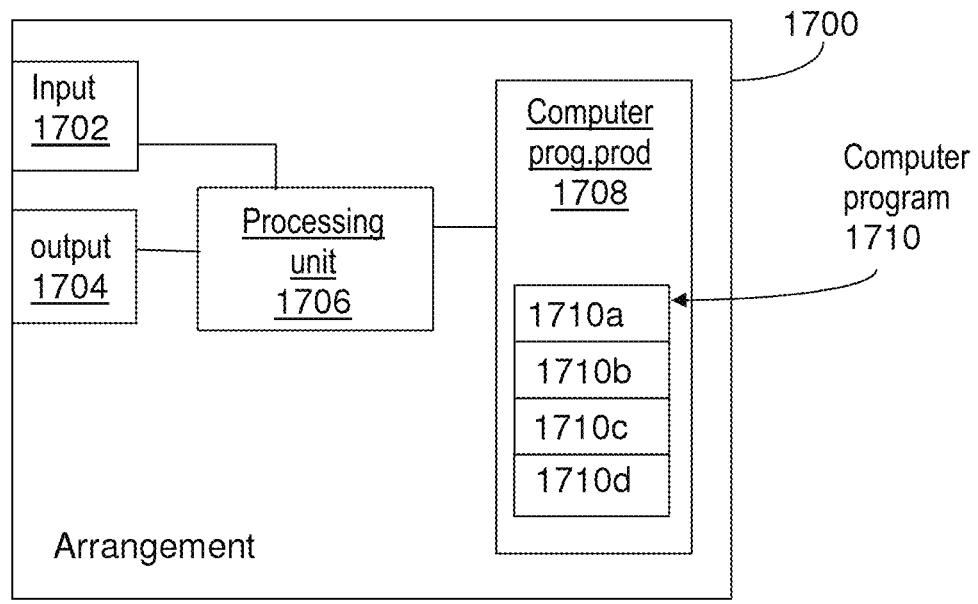

A corresponding arrangement in a UE could be described in a similar manner, with the necessary changes made, which changes may be derived from other parts of this document. Such an arrangement is illustrated in FIG. 17.

The modules 1610a-b could essentially perform the actions of any of the flows illustrated in FIGS. 12a-c and could replace the arrangement 1301 illustrated in FIG. 13. The modules 1710a-b could essentially perform the actions of any of the flows illustrated in FIGS. 14a-b and could replace the arrangement 1501 illustrated in FIG. 15.

Although the code means in the embodiment disclosed above in conjunction with FIG. 16 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node or within the UE.

The above description of various embodiments of the herein suggested technology, while not limited to use in LTE systems, should be read and understood in the context of the existing 3GPP standards and revisions thereto, and should be understood to reflect adaptations of well-known physical structures and devices to carry out the described techniques.

Examples of several embodiments of the herein suggested technology have been described in detail above. Those skilled in the art will appreciate that the herein suggested technology can be implemented in other ways than those specifically set forth herein, without departing from essential characteristics of the suggested technology.

The solution suggested by the inventors is herein mostly described in terms of LTE. It should, however, be noted that the general concepts of the solution are applicable also in other systems, such as WCDMA.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

APPENDIX TO DETAILED DESCRIPTION

In the foregoing part of the detailed description, it is sometimes referred to an EDPCCH structure as an alternative for distribution of transmission resources for broadcast of system information. For the interested, a description of the EPDCCH structure follows below. It is placed at the end of the detailed description in order not to obscure the understanding of the herein suggested solution.

Enhanced Control Signaling in Rel.11

Figure 18:
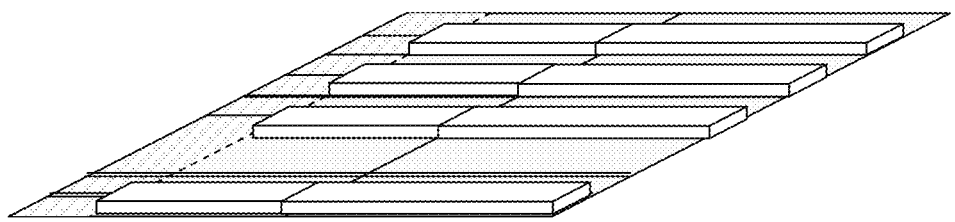
FIG. 18 illustrates a downlink subframe according to the prior art.

In LTE Rel.11, UE-specific transmission for control information in form of enhanced control channels was introduced by allowing the transmission of control messages to a UE based on UE-specific reference signals and by placement in the data region, see FIG. 18. This is commonly known as the Enhanced PDCCH (EPDCCH). A UE can be configured with one or two EPDCCH sets of N=2, 4 or 8 PRB pairs each, where the UE shall monitor the UE-specific search space instead of monitoring it on the PDCCH. The common search space control signaling remains to be monitored on PDCCH in Rel.11.

To provide means for link adaptation, an EPDCCH message consists of {1, 2, 48, 16 or 32} ECCEs where each ECCE is mapped to up to 36 RE. To facilitate the mapping of ECCEs to physical resources, each PRB pair is divided into 16 enhanced resource element groups (EREGs) and each ECCE is split into L=4 or L=8 EREGs for normal and extended cyclic prefix, respectively.

Figure 19:
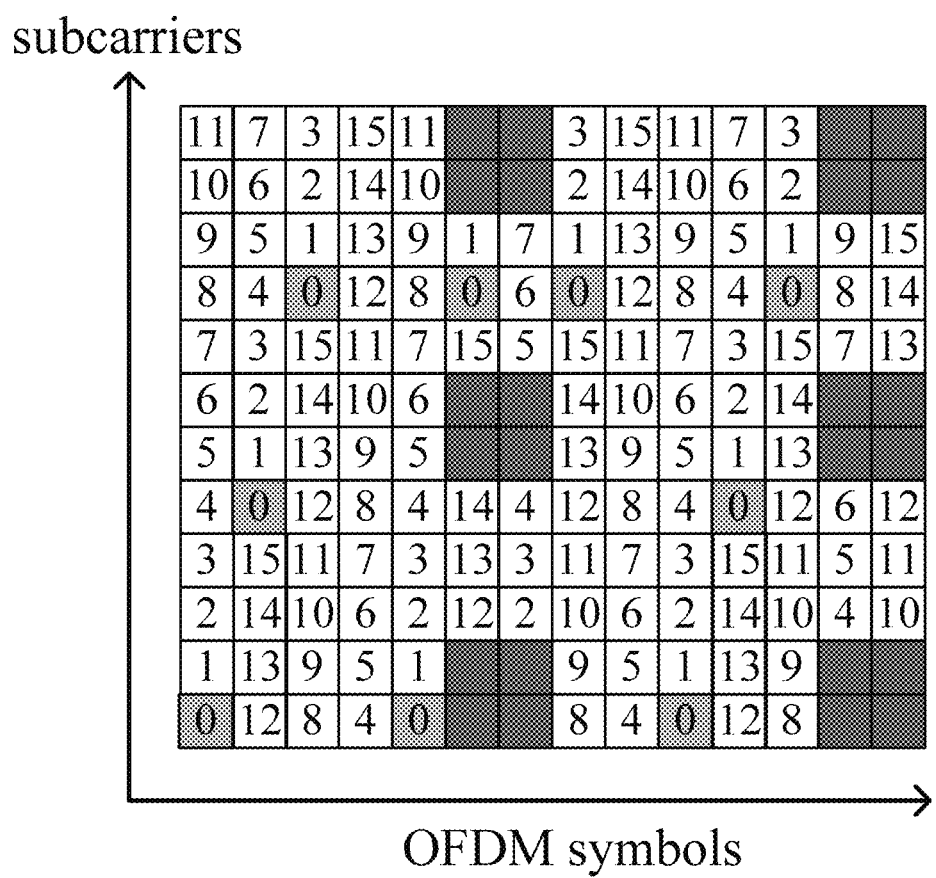
FIG. 19 shows a PRB pair of a normal cyclic prefix configuration in a normal subframe according to the prior art.

The EREGs belonging to an ECCE reside within the same PRB pair (localized transmission) or in different PRB pairs (distributed transmission) within the EPDCCH set. The division of a PRB pair into EREGs is for normal subframes and normal CP length illustrated in FIG. 19. FIG. 19 shows a PRB pair of a normal cyclic prefix configuration in a normal subframe according to the prior art. Each tile is a resource element where the number corresponds to the EREG it is grouped within. The light grey REs correspond to the REs belonging to the same EREG indexed with 0.

The first ECCE consists of EREG#{0,4,8,12} and the second ECCE of EREG#{1,5,9,13} and so on. As mentioned above, if the EPDCCH set is configured as localized, these 4 EREGs are within the same PRB pair to achieve frequency selective transmission and potentially precoding gain, otherwise they are in different PRB pairs to achieve frequency diversity.

Figure 20:
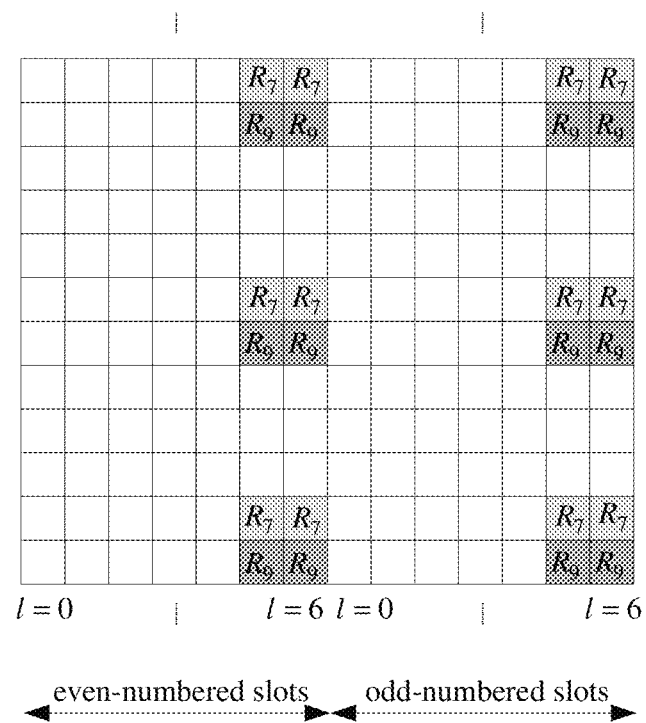
FIG. 20 shows an example of UE-specific reference symbols used for EPDCCH (Enhanced PDCCH) in LTE for one PRB pair according to the prior art.

For the enhanced control channel in Rel.11, it has been agreed to use antenna port p∈{107,108,109,110} for demodulation, referred to as the UE-specific demodulation reference signals (DM-RS). See FIG. 20 for the case of normal subframes and normal cyclic prefix. FIG. 20 shows an example of UE-specific reference symbols used for EPDCCH in LTE for one PRB pair. R7 and R9 represent the DMRS corresponding to antenna port 107 and 109 respectively. In addition can antenna port 108 and 110 be obtained by applying an orthogonal cover as (1,−1) over adjacent pairs of R7 and R9 respectively.

Figure 21A:
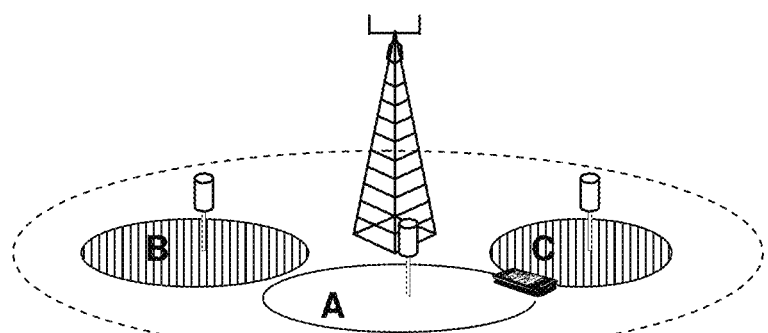
FIG. 21a shows a Heterogeneous network scenario according to the prior art
Figure 21B:
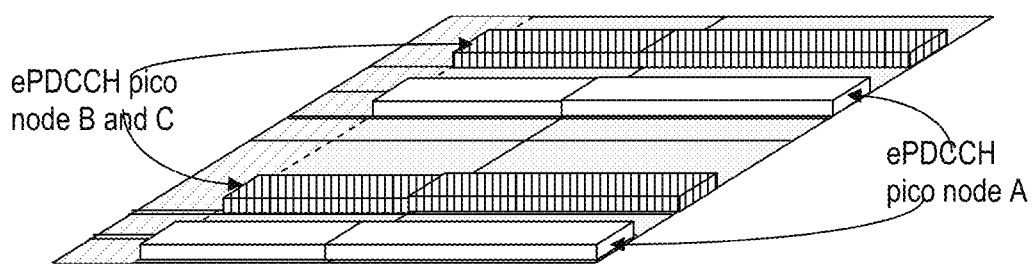
FIG. 21b shows an example of using different control regions. for different cells in a Heterogeneous network scenario according to the prior art.

FIG. 21a shows a Heterogeneous network scenario where the dashed line indicates the macro cell coverage area and A, B and C correspond to the coverage areas of three pico nodes. In a shared cell scenario A, B, C and the macro cell have the same cell ID FIG. 21b shows an example of using different control regions for the pico nodes in FIG. 21a: Pico nodes B and C are isolated and the same EPDCCH resources are reused without interference.

Figure 22:
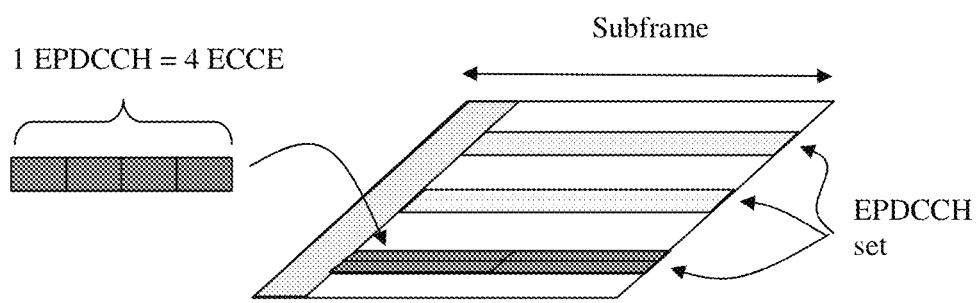
FIG. 22 shows a downlink subframe showing an EPDCCH consisting of 4 ECCE is mapped to one of the PRB pairs in the EPDCCH sets according to the prior art.

FIG. 22 shows a downlink subframe showing an EPDCCH consisting of 4 ECCE is mapped to one of the PRB pairs in the EPDCCH sets, to achieve localized transmission.

Figure 23:
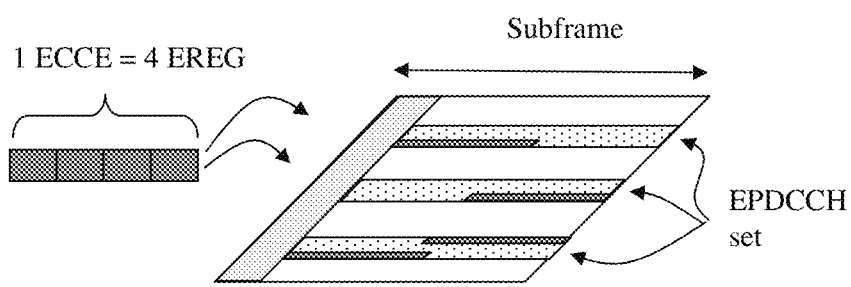
FIG. 23 shows an illustration of a downlink subframe showing an ECCE mapped to multiple PRB pairs within an EPDCCH set according to the prior art

FIG. 23 shows an illustration of a downlink subframe showing an ECCE mapped to multiple PRB pairs within an EPDCCH set in order to achieve distributed transmission and frequency diversity In case of localized transmission, the same antenna port (one of 107-110) is used for all ECCE an EPDCCH message is using in a PRB pair. In case of distributed transmission, every other RE within a used EREG is mapped to antenna port 107 and 109, respectively, in an alternating manner. Hence, in a distributed EPDCCH set, only port 107 and 109 are used.

The enhancement with UE specific precoding means that precoding gains can be achieved also for the control channels. Another benefit is that different PRB pairs (or EPDCCH sets, see e.g. FIG. 22) can be allocated to different cells or different transmission points within a cell, and thereby can inter-cell or inter-point interference coordination between control channels be achieved. This is especially useful for heterogeneous network (HetNet) scenarios as will be discussed in the next section.

Enhanced Control Signaling for Heterogeneous Networks

EPDCCH sets consisting of the same set of N PRB pairs (see FIG. 22) can be used in different transmission points that are not highly interfering each other, belonging to the same cell or to different cells. A typical case is the shared cell scenario, where a macro cell contains lower power pico nodes within its coverage area, having (or being associated to) the same synchronization signal/Cell ID, see FIG. 21a. In pico nodes which are geographically separated, as B and C in FIG. 21a, the same EPDCCH set, i.e., the same PRB pairs used for the EPDCCH can be re-used. In this manner the total control channel capacity in the shared cell will increase since a given PRB resource is re-used, potentially multiple times, in different parts of the cell. This ensures that area splitting gains are obtained. An example is given in FIG. 21b, where pico node B and C share the EPDCCH set whereas A and B, due to their proximity, are in risk of interfering with each other and are therefore assigned with EPDCCH sets which are non-overlapping. Interference coordination between pico nodes A and B, or equivalently transmission point A and B, within a shared cell are thereby achieved. In some cases, a UE may need to receive part of the control channel signaling from the macro cell and the other part of the control signaling from the nearby pico cell.

This area splitting and control channel frequency coordination is not possible with the PDCCH since the PDCCH spans the whole bandwidth and is transmitted from the same points as the cell-specific reference signal. The PDCCH does not provide possibility to use UE specific precoding since it relies on the use of CRS for demodulation.

FIG. 22 shows an EPDCCH which, similar to the CCE in the PDCCH, is divided into multiple control channel elements and mapped to one of the EPDCCH sets.

Note that in FIG. 22, the enhanced control region does not start at OFDM symbol zero, to accommodate simultaneous transmission of a PDCCH in the subframe. However, as was mentioned above, there may be carrier types in future LTE releases that do not have a PDCCH, in which case the enhanced control region could start from OFDM symbol zero within the subframe.

Distributed Transmission of Enhanced Control Signaling

Even if the enhanced control channel enables UE specific precoding as for such localized transmission illustrated in FIG. 22, it can in some cases be useful to be able to transmit an enhanced control channel in a broadcasted, wide area coverage fashion. This is useful if the eNB lacks reliable information to perform efficient precoding towards a certain UE, then a wide area coverage transmission is a more robust alternative.

Another case is when the particular control message is intended to more than one UE. In this case UE specific precoding cannot be used. An example is the transmission of the common control information using PDCCH (i.e. in the common search space (CSS)).

In any of these cases a distributed transmission over enhanced control regions can be used, as exemplified in FIG. 23 where the 4 EREG belonging to the same EPDCCH consisting of one ECCE (1 ECCE=4 EREG) are distributed over the EPDCCH set.

the New Carrier Type in Rel.12

In 3GPP LTE Rel.12, a new carrier type (NCT) will be introduced, which has cell-specific reference signals (CRS) transmitted only every $5^{th}$ subframe and only for a single antenna port (port 0). This special CRS is introduced to aid the synchronization and is therefore denoted enhanced synchronization signals (ESS) in this disclosure. In addition to the ESS, the PSS and SSS are transmitted. No other mandatory cell specific signals have been agreed to be supported on the NCT, at least not so far in the discussions.

On the NCT, UE specific RS is used to demodulate PDSCH, e.g. by using transmission mode 10 (antenna port 7-14). In addition, the DMRS based enhanced control channel (EPDCCH) which use port 107-110 is used to provide scheduling assignments. Furthermore, introduction of a common search space on EPDCCH is planned for Rel.12 LTE, so that also some system information (SIB), paging, MBMS and random access responses, carried by PDSCH, can be scheduled using port 107-110. Since EPDCCH does not use CRS (antenna port 0-3) for demodulation, the EPDCCH can directly be used on the NCT. This was also a design target when creating the EPDCCH in Rel.11.

The NCT can be associated with a legacy carrier type using carrier aggregation and the system information can be provided to the UE by the legacy carrier using higher layer signaling. It is also possible that the NCT is of stand-alone type, in which case it has to carry its own broadcast of system information.

ABBREVIATIONS

3GPP Third Generation Partnership Project
BCH Broadcast CHannel
DFT Discrete Fourier transform
ECCE Enhanced Control Channel Elements
EREG Enhanced Resource Element Group
EPBCH Enhanced Physical Broadcast Channel
EPDCCH Enhanced Physical Downlink Control Channel
ESS Enhanced Synchronization Signal
LCT Legacy Carrier Type
LTE Long-Term Evolution
NCT New Carrier Type
OFDM Orthogonal Frequency Division Multiplex
PDSCH Physical Downlink Shared CHannel
PRB Physical Resource Block
PSS Primary Synchronization Signal
RB Resource Block
SSS Secondary Synchronization Signal.

The invention claimed is:

1. A method performed by a base station for broadcasting in a wireless communication network, the method comprising:
    selecting first time-frequency resources in dependence on a cell identity of a network cell provided by the base station;
    broadcasting a synchronization signal for the network cell on the first transmission resources, the synchronization signal comprising at least one of a primary synchronization signal and a secondary synchronization signal, for use by wireless devices in gaining synchronization with the network cell;
    selecting second time-frequency resources in dependence on the first time-frequency resources, the second time-frequency resources being selected from among a plurality of candidate time-frequency resources according to a mapping function that maps different candidates for the first time-frequency resources to different candidates for the second time-frequency resources; and
    broadcasting system information on the second time-frequency resources, the system information being broadcasted on a broadcast channel of the network cell using the second time-frequency resources and comprising cell access information, for use by wireless devices in accessing the network cell.

2. The method according to claim 1, wherein the first time-frequency resources are located within a subframe.

3. The method according to claim 1, further comprising muting the remaining ones among the plurality of candidate time-frequency resources not selected as said second time-frequency resources, based on allocating zero transmission power to them when broadcasting the system information.

4. The method according to claim 1, wherein the second time-frequency resources are positioned in a different subframe than the first time-frequency resources.

5. A base station for broadcasting in a wireless communication network, the base station comprising:
    transmitter circuitry; and
    processing circuitry configured to:
        select first time-frequency resources in dependence on a cell identity of a network cell provided by the base station;
        broadcast, via the transmitter circuitry, a synchronization signal for the network cell on the first transmission resources, the synchronization signal comprising at least one of a primary synchronization signal and a secondary synchronization signal, for use by wireless devices in gaining synchronization with the network cell;
        select second time-frequency resources in dependence on the first time-frequency resources, the second time-frequency resources being selected from among a plurality of candidate time-frequency resources according to a mapping function that maps different candidates for the first time-frequency resources to different candidates for the second time-frequency resources; and
        broadcast, via the transmitter circuitry, system information on the second time-frequency resources, the system information being broadcasted on a broadcast channel of the network cell using the second time-frequency resources and comprising cell access information, for use by wireless devices in accessing the network cell.

6. A method performed by a User Equipment (UE) in a wireless communication system, for receiving information broadcasted from a base station, the method comprising:
    receiving a synchronization signal from the base station for a network cell provided by the base station, the synchronization signal being received on first time-frequency resources selected by the base station in dependence on a cell identity of the network cell and comprising at least one of a primary synchronization signal and a secondary synchronization signal;
    identifying second time-frequency resources in dependence on the first time-frequency resources, the second time-frequency resources being identified from among a plurality of candidate time-frequency resources according to a mapping function that maps different candidates for the first time-frequency resources to different candidates for the second time-frequency resources; and
    receiving system information on the second time-frequency resources, the system information being broadcasted by the base station on a broadcast channel of the network cell using the second time-frequency resources and comprising cell access information, for use by the wireless device in accessing the network cell.

7. The method according to claim 6, wherein the first time-frequency resources are located within a subframe.

8. The method according to claim 6, wherein the second time-frequency resources are positioned in a different subframe than the first time-frequency resources.

9. A User Equipment (UE) for receiving information broadcasted from a base station in a wireless communication system, the UE comprising:
    receiver circuitry; and
    processing circuitry configured to:
        receive, via the receiver circuitry a synchronization signal from the base station for a network cell provided by the base station, the synchronization signal being received on first time-frequency resources selected by the base station in dependence on a cell identity of the network cell and comprising at least one of a primary synchronization signal and a secondary synchronization signal;
        identify second time-frequency resources in dependence on the first time-frequency resources, the second time-frequency resources being identified from among a plurality of candidate time-frequency resources according to a mapping function that maps different candidates for the first time-frequency resources to different candidates for the second time-frequency resources; and receive, via the receiver circuitry, system information on the second time-frequency resources, the system information being broadcasted by the base station on a broadcast channel of the network cell using the second time-frequency resources and comprising cell access information, for use by the wireless device in accessing the network cell.

\* \* \* \* \*